(12) United States Patent
Asadullah et al.

(10) Patent No.: US 9,348,894 B2
(45) Date of Patent: May 24, 2016

(54) FACET SUPPORT, CLUSTERING FOR CODE QUERY RESULTS

(75) Inventors: Allahbaksh Mohammedali Asadullah, Hubli (IN); Susan George, Trivandrum (IN); Basava Raju Muddu, Bangalore (IN)

(73) Assignee: Infosys Limited, Bangalore (IN)

(*) Notice: Subject to any disclaimer, the term of this patent is extended or adjusted under 35 U.S.C. 154(b) by 251 days.

(21) Appl. No.: 13/111,879

(22) Filed: May 19, 2011

(65) Prior Publication Data
US 2012/0254162 A1  Oct. 4, 2012

(30) Foreign Application Priority Data
Mar. 31, 2011 (IN) .......................... 1065/CHE/2011

(51) Int. Cl.
*G06F 17/30* (2006.01)
*G06F 9/44* (2006.01)

(52) U.S. Cl.
CPC ............ *G06F 17/30657* (2013.01); *G06F 8/75* (2013.01); *G06F 17/30696* (2013.01)

(58) Field of Classification Search
CPC .................... G06F 17/30864; G06F 17/30867; G06F 17/30616
USPC ................... 707/723, 722, 736, 754; 717/124
See application file for complete search history.

(56) References Cited

U.S. PATENT DOCUMENTS

| | | | |
|---|---|---|---|
| 5,640,558 A | 6/1997 | Li | |
| 5,802,334 A | 9/1998 | Nickolas et al. | |
| 5,832,500 A | 11/1998 | Burrows | |
| 6,295,542 B1 | 9/2001 | Corbin | |
| 6,314,559 B1 | 11/2001 | Sollich | |
| 6,381,556 B1* | 4/2002 | Kazemi et al. | 702/182 |
| 6,643,641 B1 | 11/2003 | Snyder | |
| 6,728,752 B1* | 4/2004 | Chen et al. | 709/203 |
| 6,839,702 B1 | 1/2005 | Patel et al. | |
| 6,976,243 B2 | 12/2005 | Charisius et al. | |
| 6,993,710 B1 | 1/2006 | Coad et al. | |
| 7,137,112 B2 | 11/2006 | Lovvik et al. | |
| 7,454,744 B2 | 11/2008 | Bhogal et al. | |
| 7,505,964 B2 | 3/2009 | Tong et al. | |
| 7,536,408 B2 | 5/2009 | Patterson | |
| 7,577,939 B2 | 8/2009 | Bayardo et al. | |
| 7,584,453 B2 | 9/2009 | Bayardo, Jr. et al. | |
| 7,594,222 B2 | 9/2009 | Horwitz et al. | |
| 8,146,058 B2 | 3/2012 | Sarkar et al. | |
| 8,209,665 B2 | 6/2012 | Rama et al. | |

(Continued)

OTHER PUBLICATIONS

CodeRun, "CodeRun Studio: A free, cross-platform browser-based IDE," <http://www.coderun.com/studio/>, 3 pages (accessed Mar. 10, 2011).

(Continued)

*Primary Examiner* — Dennis Truong
(74) *Attorney, Agent, or Firm* — Klarquist Sparkman, LLP

(57) ABSTRACT

Techniques and tools are described for refining source-code query results. For example, source-code query results for a query can be generated, semantic clusters of the source-code query results can be generated, and based on a selection of a semantic cluster option, refined source-code query results can be sent. Also, for example, source-code query results can be received, selections of facet values associated with groups of the source-code query results can be sent, and based on selected facet values, a subset of the source-code query results can be received.

18 Claims, 18 Drawing Sheets

(56) References Cited

U.S. PATENT DOCUMENTS

| | | | |
|---|---|---|---|
| 8,392,443 B1* | 3/2013 | Allon et al. | 707/765 |
| 8,566,787 B2 | 10/2013 | Rama et al. | |
| 8,566,789 B2* | 10/2013 | Siddaramappa et al. | 717/110 |
| 8,869,097 B2 | 10/2014 | Asadullah et al. | |
| 2004/0194141 A1 | 9/2004 | Sanders | |
| 2005/0097508 A1 | 5/2005 | Jacovi et al. | |
| 2005/0278695 A1 | 12/2005 | Synovic | |
| 2006/0242147 A1 | 10/2006 | Gehrking et al. | |
| 2007/0050343 A1* | 3/2007 | Siddaramappa et al. | 707/3 |
| 2007/0061294 A1* | 3/2007 | Parnell et al. | 707/3 |
| 2007/0118542 A1 | 5/2007 | Sweeney | |
| 2007/0250810 A1 | 10/2007 | Tittizer et al. | |
| 2007/0299825 A1 | 12/2007 | Rush et al. | |
| 2008/0086451 A1 | 4/2008 | Torres et al. | |
| 2008/0127034 A1 | 5/2008 | Pasricha et al. | |
| 2008/0148225 A1 | 6/2008 | Sarkar et al. | |
| 2008/0155508 A1 | 6/2008 | Sarkar et al. | |
| 2008/0196014 A1 | 8/2008 | Kulkarni et al. | |
| 2008/0243778 A1 | 10/2008 | Behnen et al. | |
| 2008/0301639 A1 | 12/2008 | Bell et al. | |
| 2009/0007065 A1* | 1/2009 | Becker | G06F 8/443 717/110 |
| 2009/0030659 A1 | 1/2009 | Beckman et al. | |
| 2009/0058847 A1 | 3/2009 | Lewis | |
| 2009/0077091 A1 | 3/2009 | Khen et al. | |
| 2009/0119576 A1 | 5/2009 | Pepper et al. | |
| 2009/0178031 A1 | 7/2009 | Zhao | |
| 2009/0198689 A1 | 8/2009 | Frazier et al. | |
| 2010/0070949 A1 | 3/2010 | Rama et al. | |
| 2010/0131517 A1* | 5/2010 | Huang et al. | 707/752 |
| 2010/0306192 A1* | 12/2010 | Kapur et al. | 707/723 |
| 2011/0161932 A1 | 6/2011 | Nagappan et al. | |
| 2011/0295903 A1* | 12/2011 | Chen | 707/794 |
| 2012/0101929 A1* | 4/2012 | Howard | G06Q 10/1053 705/35 |
| 2012/0117459 A1* | 5/2012 | DeHaven | G06F 17/30864 715/234 |
| 2012/0166174 A1* | 6/2012 | Lipetskaia | 704/3 |
| 2012/0246610 A1 | 9/2012 | Asadullah et al. | |
| 2012/0254835 A1 | 10/2012 | Muddu et al. | |
| 2013/0226916 A1* | 8/2013 | Dredze et al. | 707/727 |

OTHER PUBLICATIONS

Nikitin et al., Microsoft, "Development Environment as a Service," P.com No. IPCOM000145426D, Original Publication Date: Jan. 16, 2007, copyright 2006 Microsoft, 8 pages.

Storey et al., University of Victoria BC, Canada and IBM Canada, "Improving the Usability of Eclipse for Novice Programmers," Proceeding eclipse '03 Proceedings of the 2003 OOPSLA workshop on eclipse technology eXchange, pp. 35-39, ACM New York, NY USA copyright 2003, 5 pages.

Brito E Abreu et al., "A coupling-guided cluster Analysis approach to reengineer the modularity of object-oriented systems," IEEE conference on software maintenance and reengineering, 2000, 10 pages.

Emanuel et al., "Modularity Index Metrics for Java-Based Open Source Software Projects,"International Journal of Advanced Computer Science and Applications, vol. 2, No. 11, 2011, 7 pages.

"360 Search Results Clustering | Serials Solutions" http://www.serialsolutions.com/360-search-results-clustering, visited Mar. 7, 2011, 3 pages.

"iBoogie—MetaSearch Document Clustering Engine and Personalized Search Engines Directory" http://www.iboogie.com/text/about.asp, visited Mar. 7, 2011, 3 pages.

"Information Visualization for Search Interfaces (Ch 10) | Search User Interfaces" from the book "Search User Interfaces," Published by Cambridge University Press, Copyright 2009, http://searchuserinterfaces.com/book/sui_ch10_visualization.html, visited Mar. 7, 2011, 58 pages.

"MOSS Faceted search," msdn archive, Nov. 1, 2010, 2 pages.

"Drupal: Faceted Search,"drupal.org/project/faceted_search, May 19, 2007, 3 pages.

Code Monkey, "Faceted search," ravelry.com, Sep. 2010, 2 pages.

Krugler et al., "Search-driven development: Five reasons why search is your most powerful tool," LinuxWorld.com, Jan. 29, 2007, http://www.networkworld.com/news/2007/012907-search.html, 4 pages.

"The 4 Hidden Costs of Code Maintenance," White Paper at Krugle.com, Sep. 2008, 9 pages.

Carrot2, http://project.carrot2.org/index.html, archived on Mar. 10, 2011, 2 pages.

Codase, http://www.codase.com, Copyright 2009, archived on Mar. 9, 2011, 1 page.

Google code search, http://www.google.com/codesearch, visited Mar. 8, 2011, 3 pages.

Jexample, http://www.jexamples.com, archived on Mar. 5, 2011, 1 page.

Koders, http://www.koders.com, archived Mar. 9, 2011, 1 page.

Krugle, http://www.krugle.com, archived Mar. 8, 2011, 1 page.

Atkinson et al., "Effective Pattern Matching of Source Code Using Abstract Syntax Patterns," *Software Practice Exper.*, 36:413-447, 2006, 35 pages.

Begel, "Codifier: A Programmer Centric Search User Interface," *Workshop on Human-Computer Interaction and Information Retrieval*, 2007, 2 pages.

Chatterjee et al., "SNIFF: A Search Engine for Java Using Free Form Queries," Proceedings of 12th International Conference on Fundamental approach to Software engineering, 2009, 16 pages.

Devanbu, "Genoa: A Customizable Language and Front End Independent Code Analyzer," *Proceedings of ICSE* (Melborne, Australia), 1992, 11 pages.

Devanbu et al., "Lassie: A Knowledge-Based Software Information System," *12th International Conference on software Engineering*, 1990, 15 pages.

Mandelin et al., "Jungloid Mining: Helping to Navigate The Api Jungle," *Programmable Language Design and Implementation*, 2005, 14 pages.

Stylos et al., "A Web Search Tool for Finding API Components and Examples," IEEE Symposium on VL and HCC, 2006, 8 pages.

Keivanloo et al., "SE-CodeSearch: A Scalable Semantic Web-Based Source Code Search Infrastructure," aseg.cs.concordia.ca, 2010, 5 pages.

Erlikh, Leveraging Legacy System Dollars for E-Business, *IT Pro*, pp. 17-23, May/Jun. 2000.

Grechanik et al., "A Search Engine for Finding Highly Relevant Applications," *Proceedings of 32nd ACM/IEEE International Conference on Software Engineering 2010*, 2010, 10 pages.

Inoue et al. "Ranking Significance of Software Components Based on Use Relations," *IEEE Transactions on Software Engineering*, vol. 31, No. 3, pp. 213-225, Mar. 2005.

Hummel et al., "Code Conjurer: Pulling Resuable Software Out of Thin Air," *IEEE Software*, pp. 45-52, Sep./Oct. 2008.

Maskeri et al. "Mining Business Topics in Source Code Using Latent Dirichlet Allocation," *1st India Software Engineering Conference*, Hyderabad, India, Feb. 19-22, 2008, 9 pages.

Reiss, "Semantics-Based Code Search," *International Conference on Software Engineering*, 2009, 11 pages.

Hoffman et al. "Assieme: Finding and Leveraging Implicit References in a Web Search Interface for Programmers," *Proceedings of the 20th annual ACM symposium on User interface software and technology*, Oct. 7-10, 2007, Newport, Rhode Island, 2007, 10 pages.

Holmes et al., "Using Structural Context to Recommend Source Code Examples," *Proceedings of the 5th International conference on Software Engineering*, May 15-21, 2005, St. Louis, Missouri, 9 pages.

Thumalapenta et al. "PARSEWeb: Programmer Assistant for Reusing Open Source Code on the Web," International conference on Automated Software Engineering, Nov. 4-9, 2007, Atlanta, Georgia 2007, 10 pages.

Sahavechaphan et al., "XSnippet: Mining for Sample Code," *OOPSLA 2006*, 2006, 19 pages.

Bajracharya et al., "Sourcerer: A Search Engine for Open Source Code Supporting Structure Based Search," *Proceedings of 21st conference on Object oriented programming, Systems, Languages and Applications*, Oct. 22-26, 2006, Portland, Oregon, 2 pages.

(56) References Cited

OTHER PUBLICATIONS

Henninger, "Supporting the Construction and Evolution of Component Repositories," *International Conference on Software Engineering*, pp. 279-288, 1996.

Sillito et al., "Questions Programmers Ask During Software Evolution Tasks," *Proceedings of the 14th ACM SIGSOFT International Symposium on Foundations of Software Engineering*, Nov. 5-11, 2006, Portland, Oregon, 2006, 11 pages.

Paul et al., "A Framework for Source Code Search Using Program Patterns," *IEEE Trans. Software Engineering*, vol. 20, No. 6, pp. 463-475, Jun. 1994.

Ye et al., "Supporting Reuse by Delivering Task Relevant and Personalized Information," *International Conference on Software Engineering*, Buenos-Aires, Argentina, May 19-25, 2002, 11 pages.

Chestnutt, CodeGaffe: Avoid.NET "partial" classes in C# and VB, Apr. 5, 2006, pp. 1-6.

\* cited by examiner

FACET SUPPORT, CLUSTERING FOR CODE QUERY RESULTS

CROSS REFERENCE TO RELATED APPLICATIONS

This application claims priority from Application No. 1065/CHE/2011, filed in India on Mar. 31, 2011, which is hereby incorporated by reference herein.

BACKGROUND

Large software systems can be difficult to maintain. There are tools and technologies that enable maintainers to analyze and fix bugs in software. However, searching large repositories of software source code can be difficult and time consuming. Source code repositories can have millions of lines of code written in various programming languages over many years by multiple source code developers. A developer searching for source code may not have knowledge of the contents of the source code repositories or the functionality of the source code stored. Traditional source code search methods can be limited by a lack of understanding of the contents of the stored source code. In many cases, irrelevant or too many hits are found, limiting the usefulness of current search tools.

SUMMARY

In Summary, the Detailed Description presents a variety of tools and techniques related to refining source-code query results while searching for source code.

According to one implementation of the technologies described herein, source-code query results can be generated in response to a query used to search for source code. Semantic clusters of the query results can be generated. Semantic clusters can group query results according to concept similarity. Refined source-code query results can be sent based on a selection of a semantic cluster option. For example, source-code query results that are associated with a selected semantic cluster option can be returned as refined source-code query results.

In another implementation, a system can receive source-code query results in response to a source-code query. Selections of facet values associated with groups of the source-code query results can be sent. A facet value can group or be associated with source-code query results grouped based on an attribute of a segment of source code. A subset of the source-code query results can be received based on selections of facet values. For example, source-code query results that are associated with a selected facet value can be returned as refined source-code query results.

In yet another implementation, source-code query results associated with index documents can be generated in response to a query of an index of source code. Facet values and semantic clusters can be determined based on the index documents associated with the source-code query results. Refined source-code query results can be determined based on the intersection of semantic clusters and facet values. For example, source-code query results that are both associated with a facet value and a semantic cluster can be returned as refined source-code query results.

In a further implementation, a system can send a source-code query for searching a source-code repository. A query response including source-code query results and semantic cluster options included in a concept wheel can be received. The semantic cluster options can be selected. Based on the selected semantic cluster options, refined source-code query results can be received.

This Summary is not intended to be used to limit the scope of the claimed subject matter. The foregoing and other objects, features, and advantages of the technologies will become more apparent from the following Detailed Description, which proceeds with reference to the accompanying figures.

DETAILED DESCRIPTION

EXAMPLE 1

Exemplary Overview

There are a variety of circumstances under which it may be desirable to search for source code. For example, a user may want to reuse source code written for a previous project to quickly advance a new project's development. Often traditional searching methods provide users a large numbers of hits when searching for source code. Searching through large numbers of results can slow down a search for relevant source code. The cluster based search and facet based search techniques described herein can be used for refining source-code query results for efficient searching of source code.

EXAMPLE 2

Exemplary System Employing a Combination of the Technologies

Figure 1:
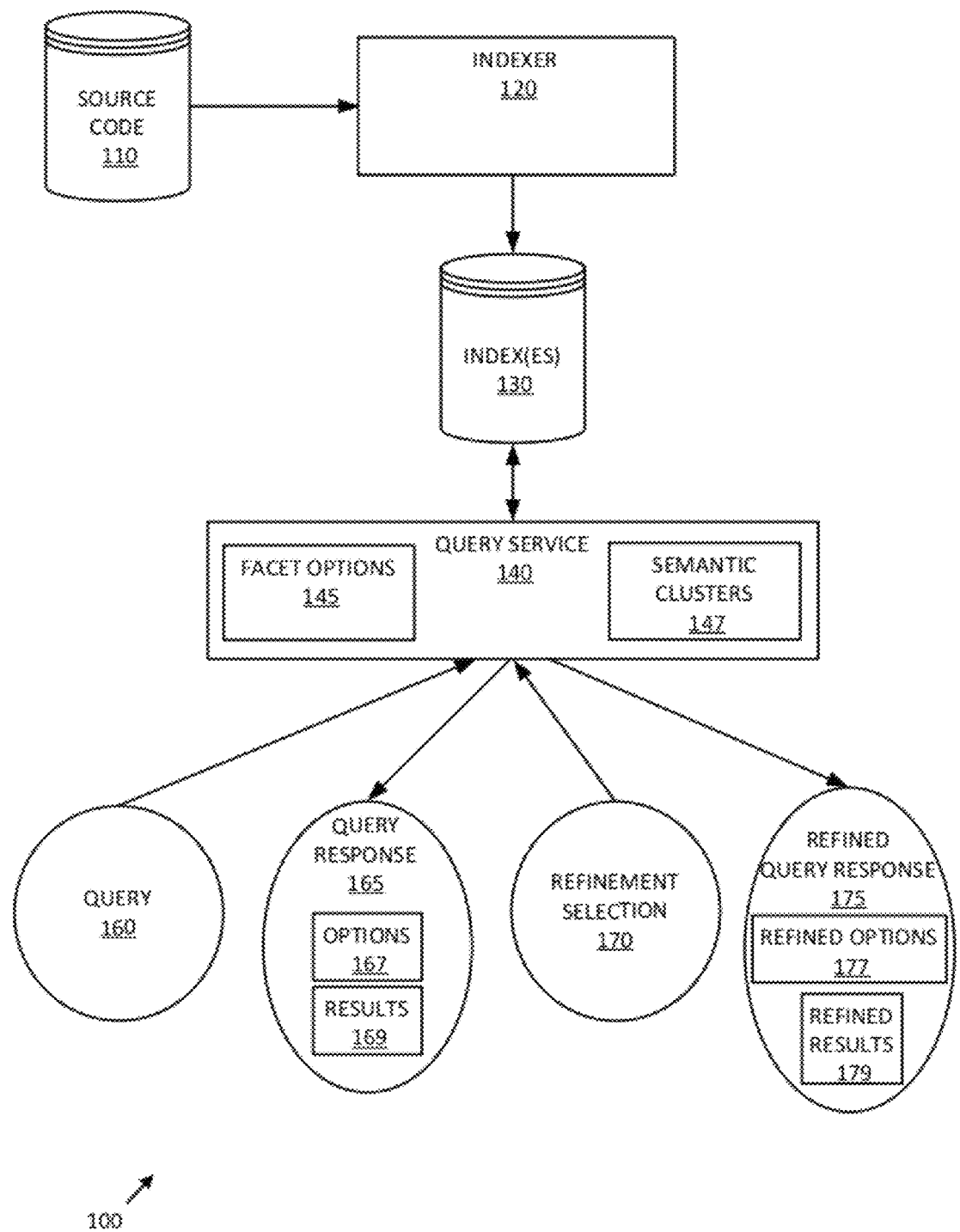
FIG. 1 is a diagram of an exemplary system that can refine a source-code query response.

FIG. 1 is a diagram of an exemplary system 100 that can refine source-code query responses. In the system 100, source code 110 can be indexed in index 130 by indexer 120. For example, the indexer can parse source code into discrete segments according to a programming language's syntax. The segments of source code, such as code elements, that are stored in the index 130 can be searched. For example, a user can search for code elements, such as classes, methods, functions or the like. Values and information related to attributes of the code elements can be extracted and input into fields as searchable values included in the index of the code element.

A source-code query 160 can be sent to query service 140. For example, a user searching for source code can send an original query with query terms and operators. For example, a user searching for source code can input the source-code query 160 into a search user interface. The source-code query 160 can have query terms and operators such as the query "class:foo AND function:bar."

Using source-code query 160, the query service 140 can search the index 130 and determine source-code query results. For example, the query service 140 can generate a list of query results that correspond to source code elements that conform to the user's query such as classes named foo with functions named bar.

Using the source-code query results 169, semantic clusters 147 can be determined. For example, the list of query results generated can be automatically clustered into subgroups based on concepts found in the large number of code elements associated with the clustered query results. A concept can be words common to the code elements or some other identified concept such as a business concept. For example, multiple classes relating to interest calculations (e.g., currentInterestRate, computeInterest, returnInterestTable) can be included in an identified semantic cluster.

Also, using the source-code query results 169, facet options 145 can be determined. A facet option can include facets that categorize source-code query results and facet values that are associated with groups of source-code query results categorized by facets. Facets can be used to localize source-code query results based on attributes of code elements such as classes and methods. For example, "EXTENDS" can be a facet that categorizes source-code elements with the attribute of extending (e.g., a class). A facet value can be associated with a subgroup of source code query results of the facet grouped based on a particular source-code attribute. For example, for source-code elements categorized by the facet "EXTENDS" with the attribute of extending (e.g., a class), a facet value can be associated with a subgroup of the source-code elements of the facet that extend a particular class, such as the named class "abstractClass." So the facet value can be associated with a group of source-code query results that each extend the named class "abstractClass."

In response to the source code query 160, a query response 165 can be provided which includes query options 167 and source-code query results 169. For example, a user can be provided the options to choose from the groupings to narrow the large number of query results. Query options 167 can include one or more facet options, one or more semantic cluster options or both facet options and semantic cluster options. Query options 167 can also include other options. In sending the query response 165, source-code query results 169 and query options 167 can be sent at the same time, at different times, or in parallel. In one example, semantic cluster options can be provided for selection in a results clustering user interface such as a concept wheel. In another example, facet options can be provided for selection in a faceted search user interface.

A refinement selection 170 can be sent to query service 140. A refinement selection can be the selection of one or more source-code query options such as a semantic cluster option or a facet option. For example, a user can select one of the query options 167 and that selection can be sent to query service 140. In another example, the user can choose which semantic cluster is most appropriate by viewing the concepts identified during clustering. In a further example, a user can select a facet value such as one that returns classes that extend a particular or named class.

In response to the selected refinement option, query service 140 can send refined query response 175. The refined query response 175 can include refined query options 177 and refined source-code query results 179. The refined options 177 can include refined semantic cluster options, refined facet options, or both. In one example, a user can select one of the semantic cluster options, and the source-code query results associated with the selected semantic cluster option can be returned as the refined source-code query results. In another example, a user can select one of the facet values, and the source-code query results associated with the selected facet value can be provided to the user as refined source-code query results.

EXAMPLE 3

Exemplary Method of Employing a Combination of the Technologies

Figure 2:
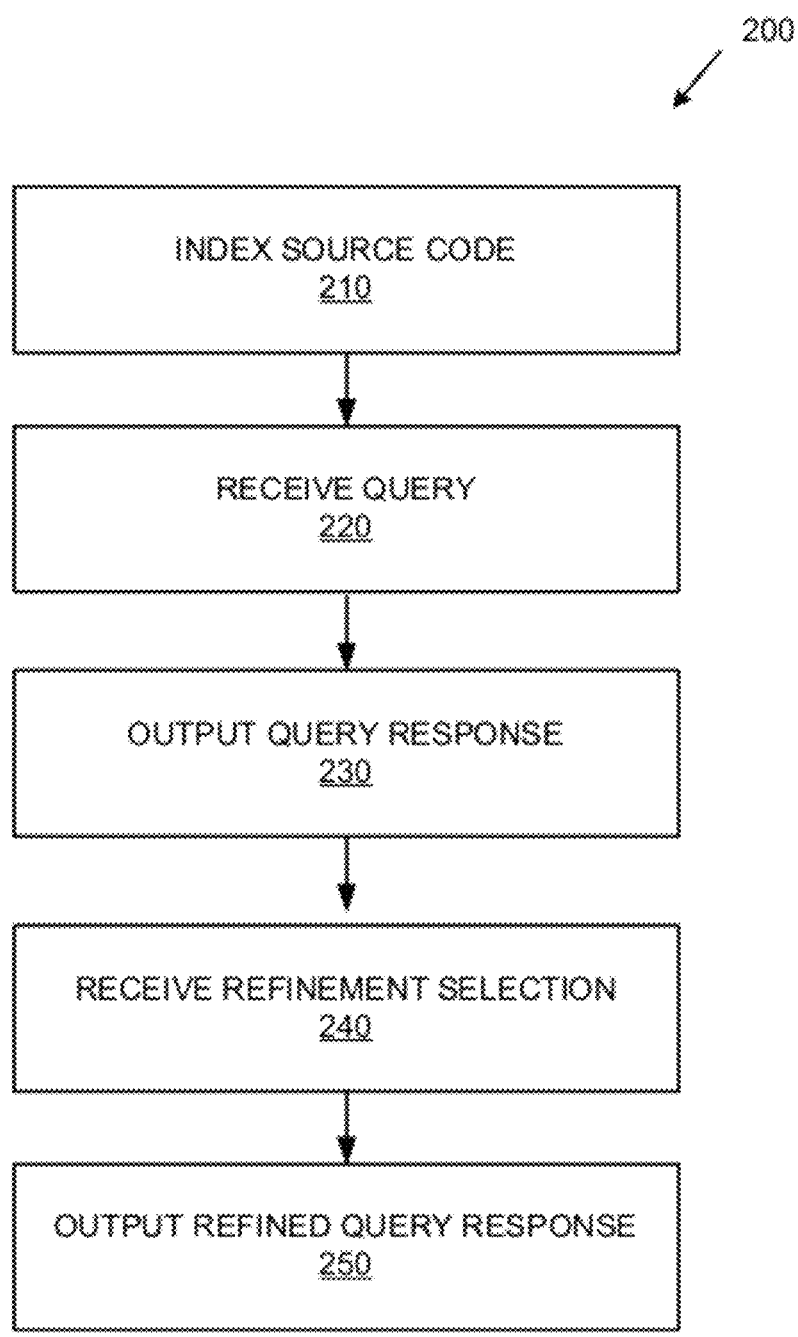
FIG. 2 is a flowchart of an exemplary method of outputting a refined source-code query response.

FIG. 2 is a flowchart of an exemplary method 200 of outputting a refined source-code query response. In the example, source code can be indexed at block 210.

At block 220, a query can be received. For example, a user can send a query to search for source code that is indexed.

At block 230, a query response can be output or sent. For example, a response of source-code search results and query options can be sent as choices for user selection.

At block 240 a refinement selection can be received. A refinement selection can include a selected facet option, a selected semantic cluster option or both. For example, a user selection of one or more of the query options can be received.

At block 250, a refined query response can be output or sent. For example, refined source code search results and query options generated based on the refined source code search results can be sent as choices for user selection.

EXAMPLE 4

Exemplary System Employing a Combination of the Technologies

Figure 3:
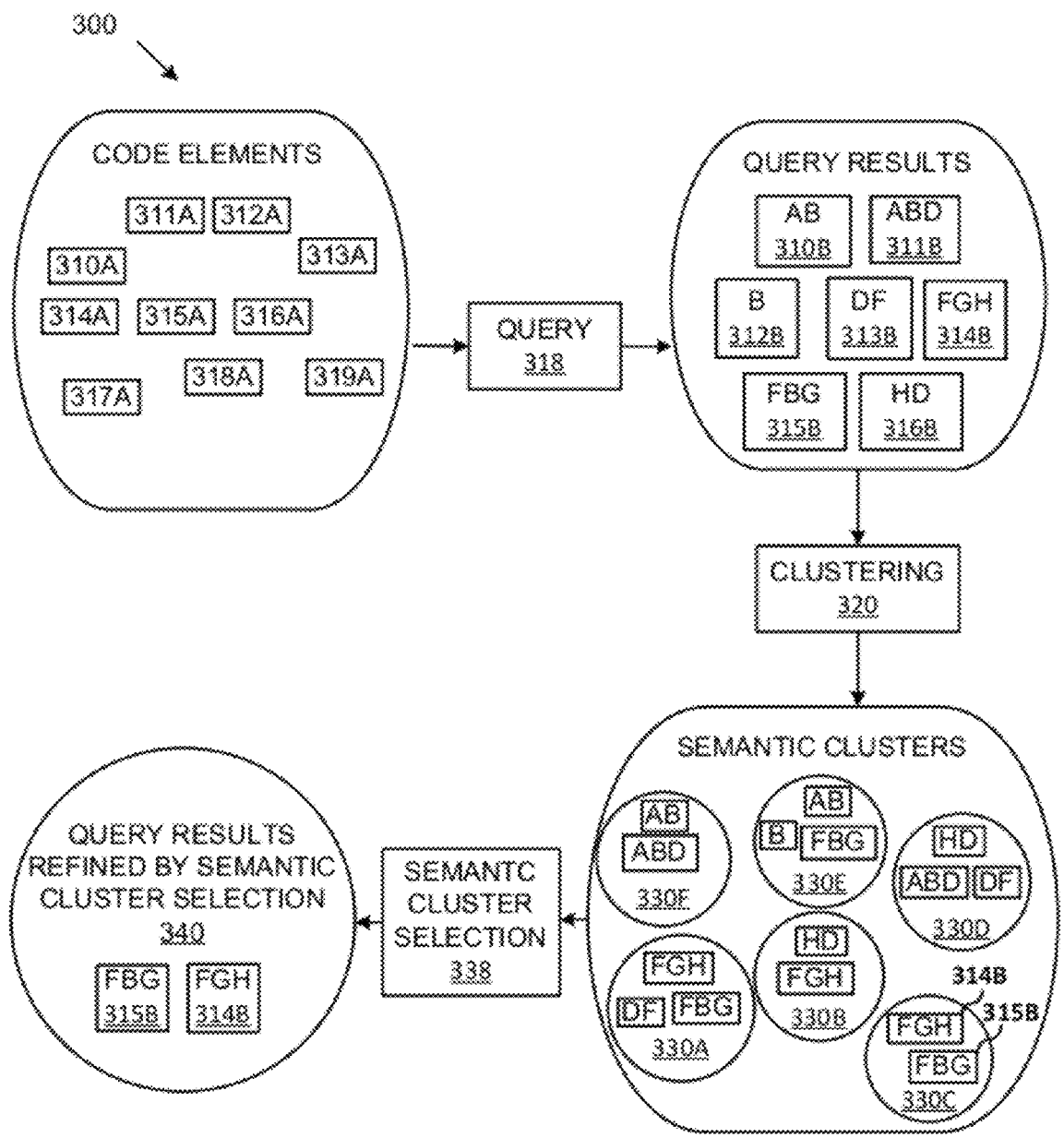
FIG. 3 is a diagram of an exemplary system that can refine source-code query results using semantic clusters.

FIG. 3 is a diagram of an exemplary system 300 that can refine source code query results based on one or more semantic clusters. In the system 300, code elements 310A-319A can be stored. For example, source code can be stored or referenced by a repository such as an index.

The stored code elements 310A-319A can be queried 318. Query results 310B-316B can be determined based on the query 318. Each of query results 310B-316B can be a query result corresponding to one of each of code elements 310A-316A. For example, the source-code search result 314B can be used to retrieve code element 314A.

The source code search results can be clustered 320. Semantic clusters 330A-F of query results 310B-316B can be determined. For sake of simplicity the elements are shown as containing similar character strings. However, in practice, any semantic clustering technique can be employed.

A semantic cluster selection 338 can be made. For example, a user of the system can select a semantic cluster such as semantic clusters 330A-F. Query results 310B-316B can be refined based on the semantic cluster selection 338. For example, a user can select semantic cluster 330C and query results 315B and 316B can be returned as refined query results.

EXAMPLE 5

Exemplary Method of Employing a Combination of the Technologies

Figure 4:
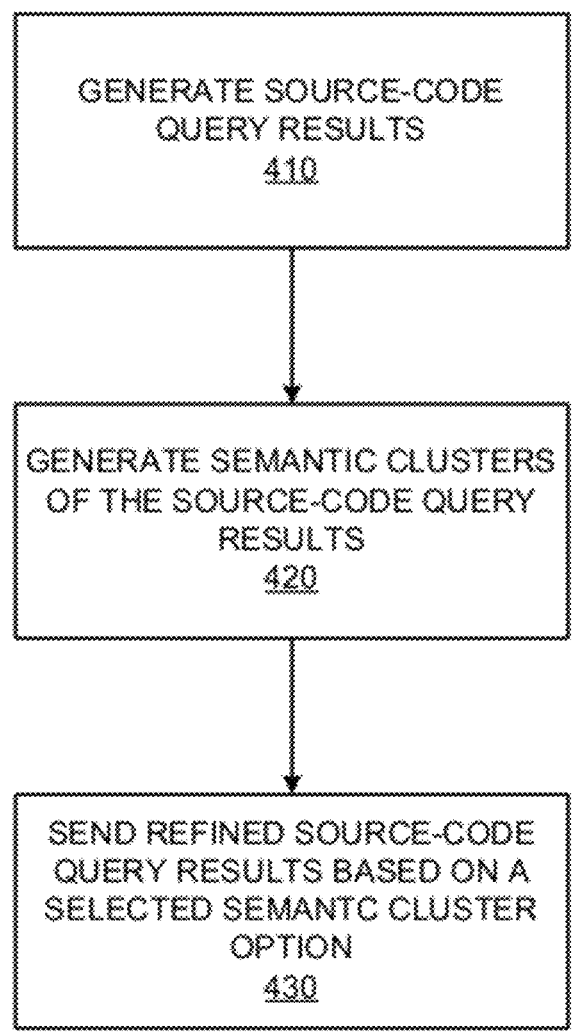
FIG. 4 is a flowchart of an exemplary method of sending refined source-code query results.

FIG. 4 is a flowchart of an exemplary method 400 of sending refined source-code query results. At block 410 source-code query results can be generated. For example, source-code query results can be created in response to a query used to find source-code.

At block 420 semantic clusters of the source-code query results can be generated. For example, subsets of the source-code query results can be created. In one example, semantic clusters can be associated with semantic cluster options that can be provided to a client in a query response along with source-code query results. The semantic cluster options and source-code query results can be rendered in a user interface at the client.

At block 430 refined source-code query results can be sent based on a selected cluster. For example, a user can select a semantic cluster and the cluster can be sent as refined source-code query results.

EXAMPLE 6

Exemplary Method of Employing a Combination of the Technologies

Figure 5:
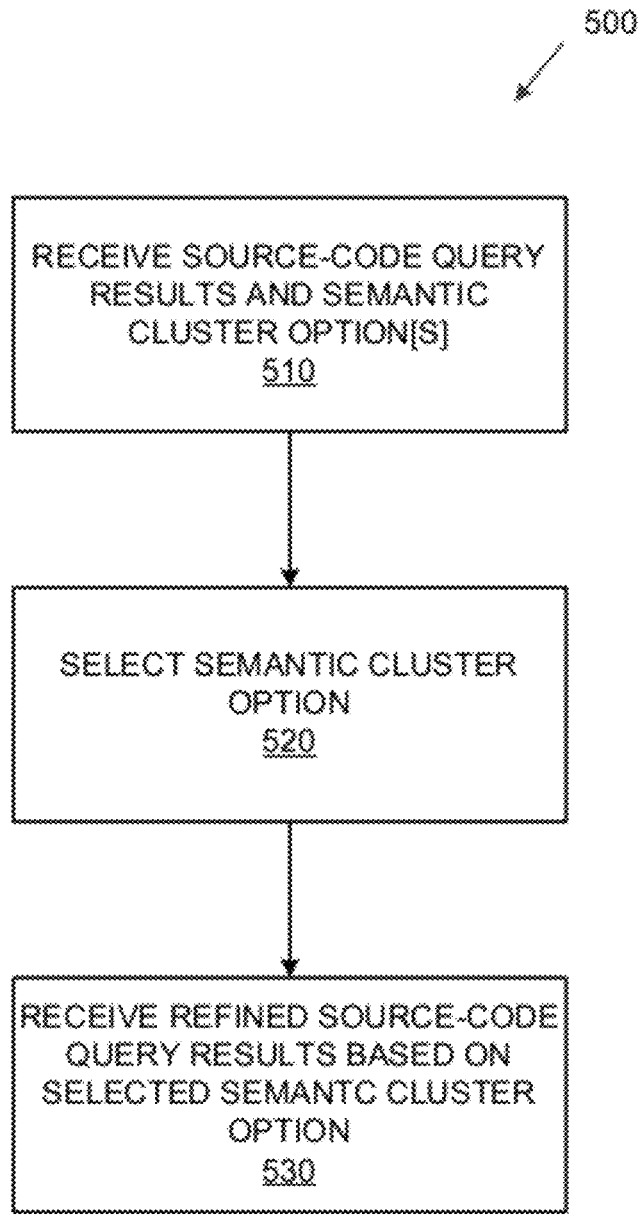
FIG. 5 is a flowchart of an exemplary method of receiving refined source-code query results using a semantic cluster option.

FIG. 5 is a flowchart of an exemplary method 500 of receiving refined source-code query results based on a semantic cluster option. At block 510, source-code query results and one or more semantic cluster options can be received.

At block 520, a semantic cluster option can be selected. For example, a user can select a semantic cluster option by using a concept wheel user interface.

At block 530, refined source-code query results can be received based on the selected semantic cluster option.

EXAMPLE 7

Exemplary System Employing a Combination of the Technologies

Figure 6:
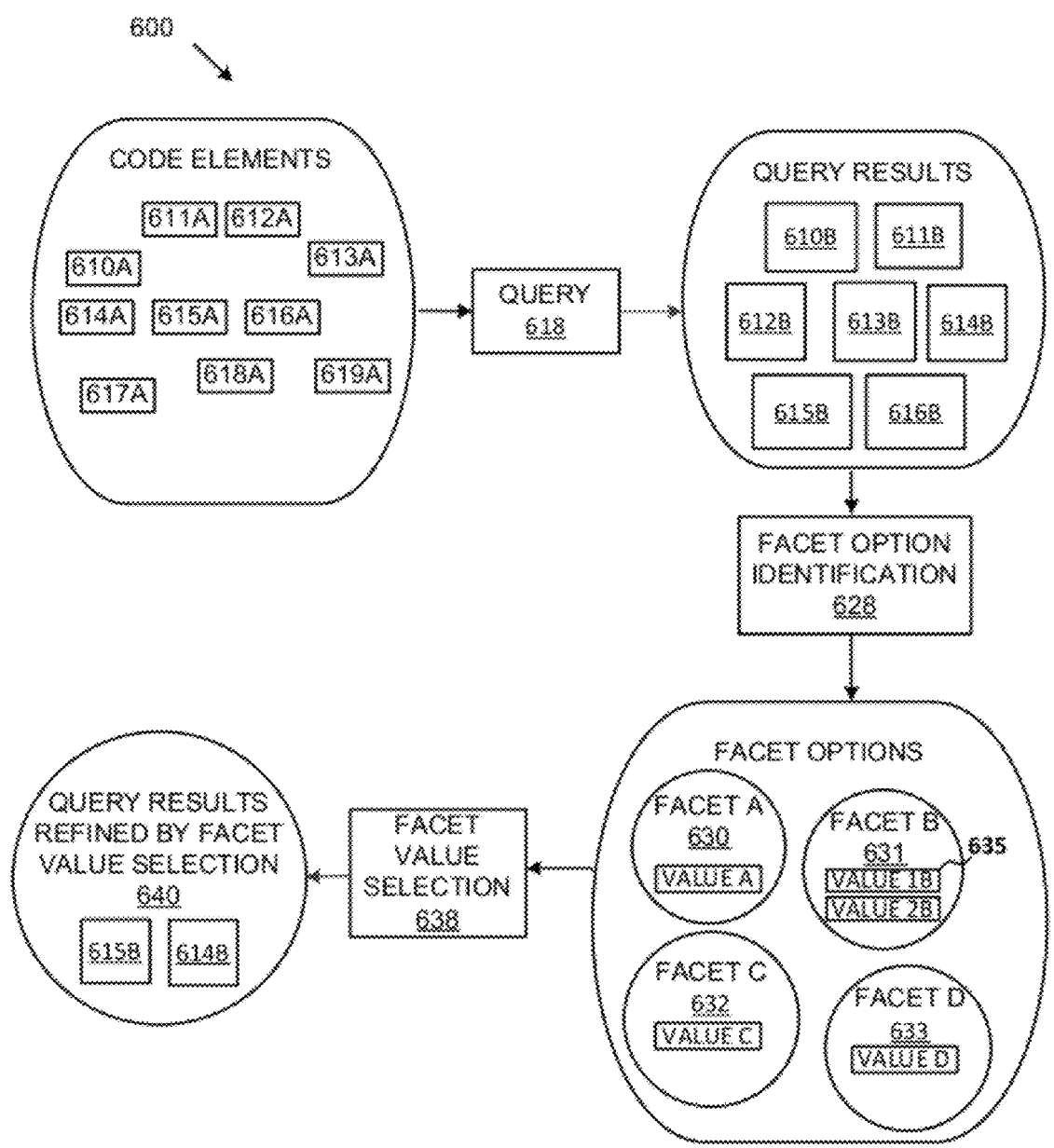
FIG. 6 is a diagram of an exemplary system that can refine query results using facet values.

FIG. 6 is a diagram of an exemplary system 600 that can refine query results based on one or more facet values. In the system 600, code elements 610A-619A can be stored. For example, source code can be stored or referenced by a repository such as an index. The stored code elements 610A-619A can be queried 618.

Query results 610B-616B can be determined based on the query 618. Each of query results 610B-616B can be a query result corresponding to one of each of code elements 610A-616A. For example, the source code search result 614B can be used to retrieve code element 614A.

Facet options 630-633 of the code elements 610A-616A corresponding to query results 610B-616B can be identified. Facet options 630-633 can include facet values such as facet value 635. A facet value selection 638 can be made. For example, a user of the system can select one or more facet values.

Query results 610B-616B can be refined based on the semantic cluster selection 638. For example, a user can select facet value 635 which corresponds to the group of query results 615B and 616B. Then query results 615B and 616B can be returned as the refined query results 640.

EXAMPLE 8

Exemplary Method of Employing a Combination of the Technologies

Figure 7:
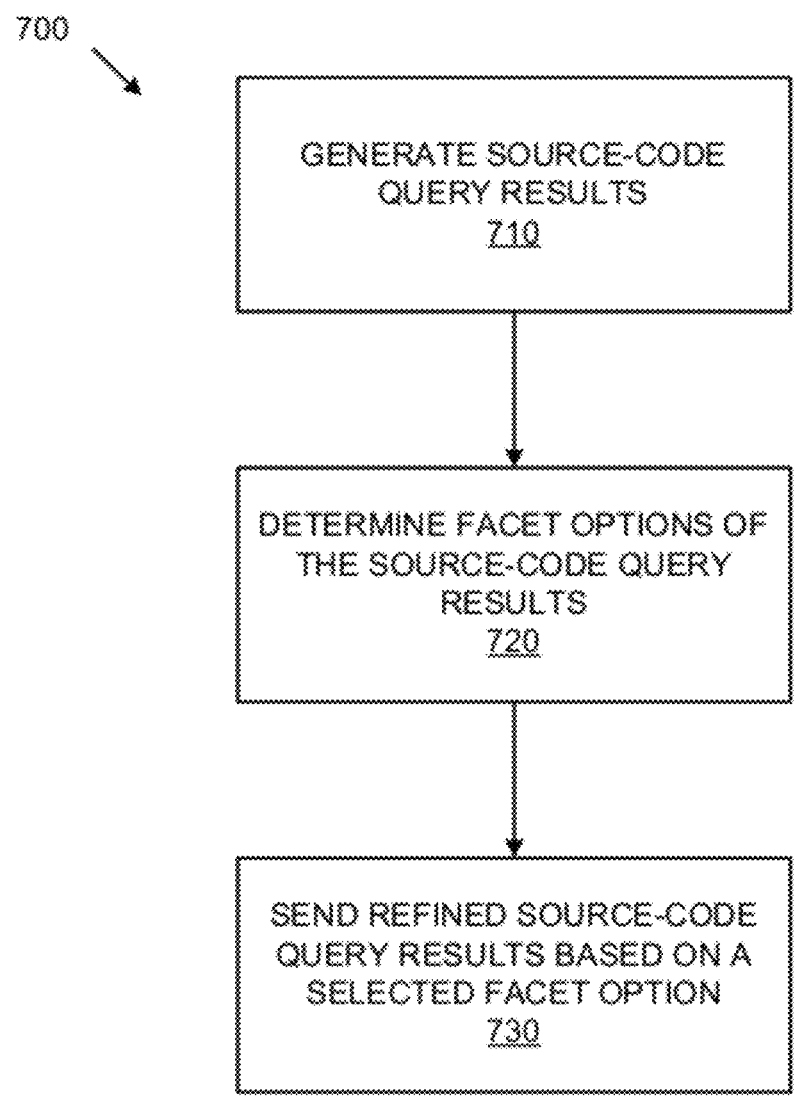
FIG. 7 is a flowchart of an exemplary method of sending refined source-code query results based on selected facet options.

FIG. 7 is a flowchart of an exemplary method 700 of sending refined source-code query results based on a selected facet option. At block 710, source-code query results can be generated. At block 720, facet options of the source-code query results are determined. In one example, facet options and source-code query results can be sent in a query response to a client for rendering in a user interface. At block 730, refined source-code query results can be sent based on a selected facet option.

EXAMPLE 9

Exemplary Method of Employing a Combination of the Technologies

Figure 8:
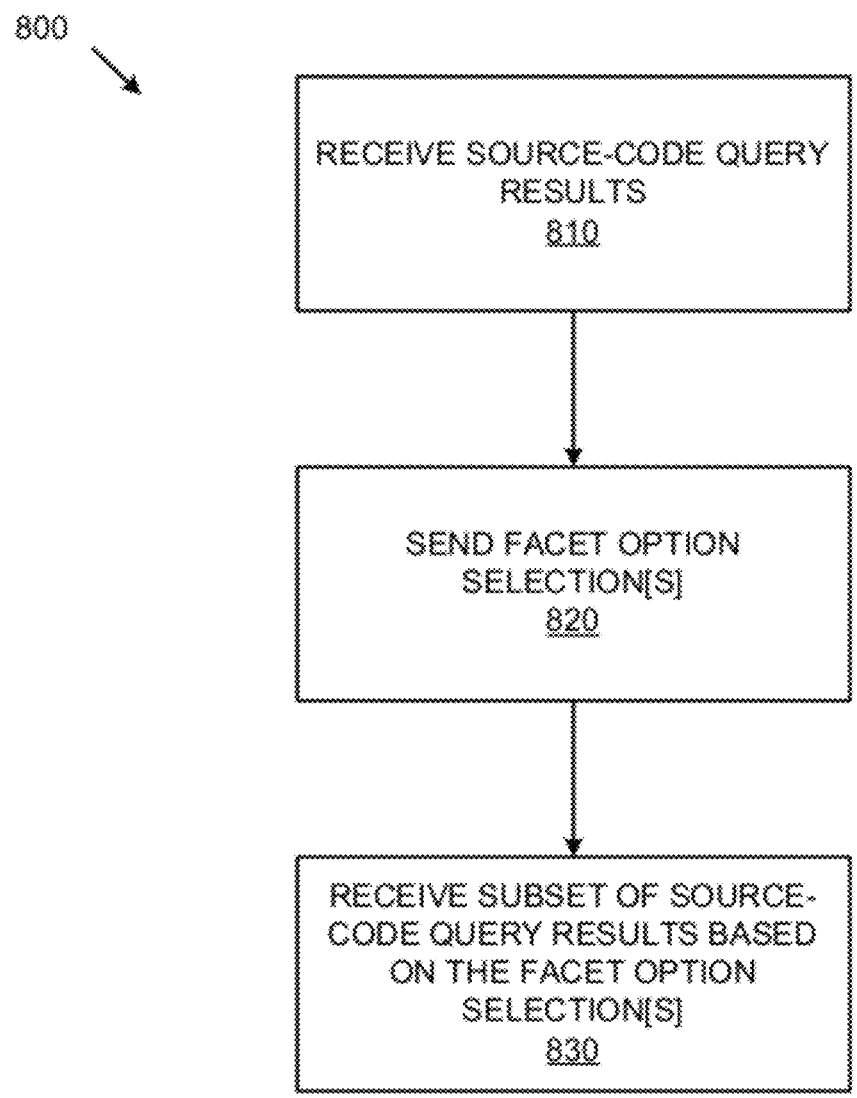
FIG. 8 is a flowchart of an exemplary method of receiving a subset of source-code query results based on selected facet options.

FIG. 8 is a flowchart of an exemplary method 800 of receiving a subset of source-code query results based on one or more selected facet options. At block 810, source-code query results are received. At block 820, one or more facet option selections are sent. At block 830, a subset of source-code query results are received based on the one or more selected facet options.

EXAMPLE 10

Exemplary Result-Clustering User Interface

Figure 9A:
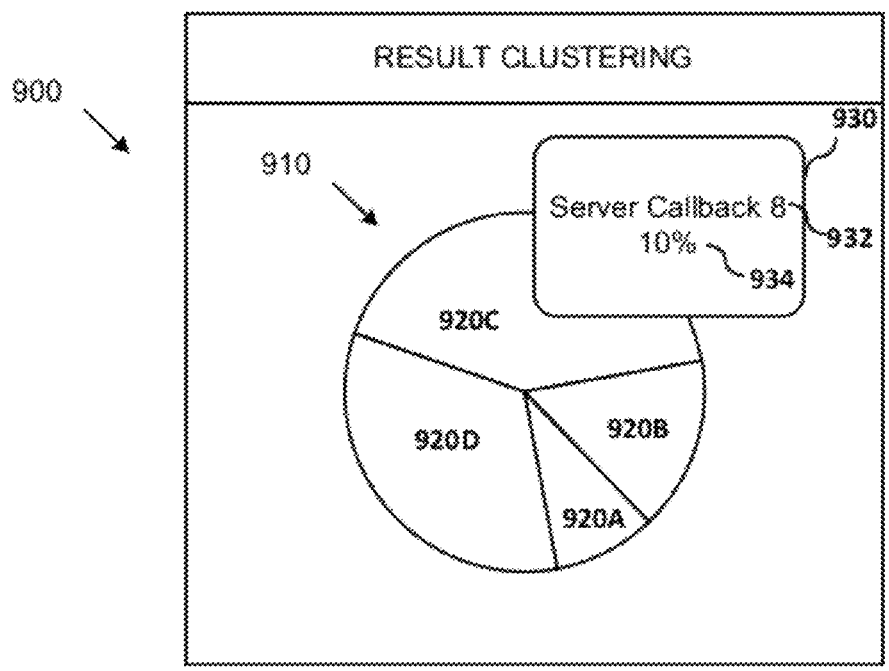
FIG. 9A illustrates an exemplary result-clustering user interface.

FIG. 9A illustrates an exemplary result-clustering user interface (result-clustering UI) 900. The result-clustering UI can have a concept wheel 910. The concept wheel 910 can include one or more cluster options 920A-D that can be based on concepts in source-code elements of source-code query results. The semantic cluster options 920A-D can correspond to a portion of the area of the concept wheel 910. The semantic cluster options 920A-D can be wedges of the concept wheel 910, although other shapes can be used as an alternative for a wheel or wedges.

The result-clustering UI can display cluster information such as cluster information 930. The cluster information 930 can include a cluster identifier 932 and a cluster percentage 934. The cluster percentage 934 can correspond to the percentage of the area of the concept wheel 910 that includes the cluster option 920A. The cluster percentage 934 can also indicate a percentage of the source-code query results included in a semantic cluster associated with the cluster option 920A.

Semantic cluster options 920A-D can be shown in the concept wheel 910 so a user can understand the dominance of concepts found by clustering the source-code query results. A concept wheel can help a user to analyze and determine modularity guidelines for a software system. For example, a semantic cluster option that includes a large wedge can indicate a dominant concept among associated source-code query results. A user can decide to look at or select a semantic cluster option for more understanding of the concept or eliminate the unwanted concepts so that the query results can be more effectively used. For example, a user can eliminate a semantic cluster option and new semantic cluster options and wheel can be created based on the elimination of the concept from the clustering.

In one example, user can look at a dominant concept by selecting the corresponding cluster option 920A or view its cluster information 930. The cluster information 930 can be displayed when designated. For example, the cluster information 930, corresponding to cluster option 920A, can be displayed when a cursor hovers over the cluster option 920. In other examples, the cluster information 930 can be designated using other techniques such as highlighting, selecting, or the like.

In alternative embodiments, a result clustering UI may include the use of shapes other than a wheel and wedges, such as quadrilaterals, ovals, polygons, asymmetrical shapes, and the like.

EXAMPLE 11

Exemplary Faceted-Search User Interface

Figure 9B:
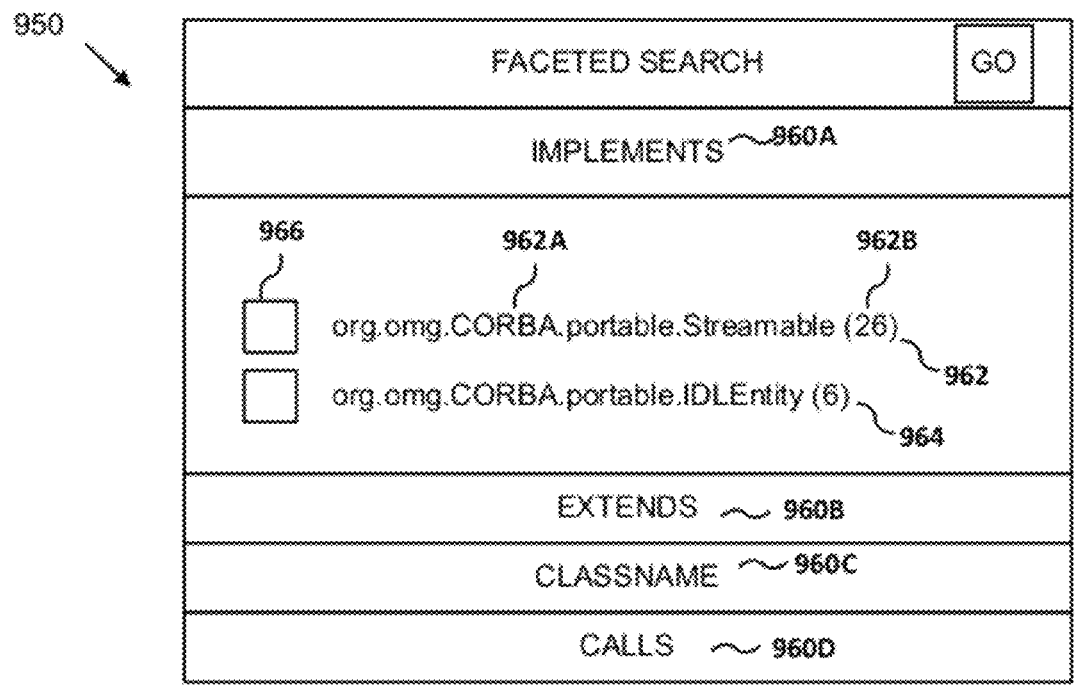
FIG. 9B illustrates an exemplary faceted-search user interface.

FIG. 9B illustrates an exemplary faceted-search user interface (faceted-search UI) 950. The faceted-search UI can include one or more facets 960A-D. Each of the one or more facets 960A-D can be a category based on a code attribute associated with source-code query results. Each of the one or more facets can be selected. For example, a user can select facet 960A by clicking on the facet or by some other selection method.

Each of the facets 960A-D can include one or more facet values 962, 964. Each of the facet values 962, 964 can include a code element identifier 962A and a results indicator 962B. For example, the code element identifier 962A indicates a group of source-code query results that implement the interface "org.omg.CORBA.portable.Streamable." The results indicator 962B indicates that there are 26 classes in the group of source-code query results that implement the interface of element identifier 962A. The facet values 962, 964 can be selected individually or in groups or subgroups.

EXAMPLE 12

Exemplary Indexing of Source Code

In any of the examples herein, an indexer can index source code according to the source code's structure at least by parsing source code based on the syntax of the source code written in a programming language. The indexer can parse source code into discrete segments of source code. That is to say, the indexer can divide up the source code (e.g., text of the source code) into discrete segments of source code. The segments can be functional units (e.g. a class), or portions of the text of the source code (e.g., a name of a class). In one implementation, a parser can extract information (e.g., words, phrases, text segments, code segments, values) from the text of code elements. The extracted information can be used to create indexes of the code elements. For example, for the source code segment "public class BankingClient extends Bank," an indexer can divide up the code and extract information including the words "public," "class," and "BankingClient." Because the source code segment is arranged according to a programming language, the indexer can determine that the code element is a "class" and that it is a "public" class. Also, the indexer can determine that the class is named "BankingClient" and that the class extends the code element Bank.

In some examples, segments of source code can be code elements. For example, segments of source code can be code elements, such as classes, methods, functions and the like. The indexer can determine code elements based on source code files or from parsing the source code according to a programming language. For example, the indexer can identify that a class contained in a source code file is a code element because source code files can be organized so that a file (e.g., each file) contains one respective code element. That is to say, the indexer can use the content of individual source code files as discrete code elements rather than extracting textual code segments or statements. Additionally, the indexer can parse source code to extract information for index documents including field information, value information, source code text, attribute information, facet information, facet value information, cluster information, identifier information, dependencies between code elements, and other like information that can be stored or indexed. In a further example, once a class is indexed, a code developer wanting to reuse the class can search for the class as a code element of the source code or software. The indexing can be done before runtime or after runtime. Indexing code before runtime can speed up the process for large software repositories.

While indexing, segments of source code can be determined by parsing the source code according to a programming language's syntax. For example, an indexer parsing source code according to the Java language can extract a class as a code element because the parser can determine the boundaries (e.g., beginning, end or body) of a class based on the syntax of the Java language. The indexer can also determine the attributes of a code element by parsing sub-portions of the code of the code element. For example, a class may implement an interface and the indexer can determine that attribute. In a further example, an indexer can use the content of individual source code files as discrete code elements rather than extracted plain text code segments or statements.

When indexing source code files, relevant attributes, information, or values for each source-code file can be identified and extracted. The attribute can be reflected in the code (e.g., text) of the code element, and that attribute can be recognized and extracted by parsing according to the programming language of the code. In one exemplary embodiment of the indexer, the indexer can use the Eclipse JDT parser to parse source code. In other embodiments of an indexer some other parser can be used.

While indexing source code, the indexer can produce source-code documents and index documents. In index documents, code elements, attributes, fields, values and dependencies can be stored. The indexer can extract the values such as code segments or pieces of code including words, phrases, or a segment of the source code. The indexer can input the extracted values into fields of the index documents stored in the index. For example, an indexer can extract a class as a code element, and for the code element it can input values into an index document for the class. The values can be the name of the class, the methods of the class and other attributes of the class. The indexer can parse the class to extract attributes of the class and input values into the index document's fields based on those attributes. For example, the index document for the class can have a code field where the indexer inputs the source code for the class.

In addition to index documents the indexer can produce source-code documents that can be returned to a user searching for the source code. The produced source-code documents can be intelligently formatted HTML files including the source code or code element. The source-code documents can display the source code of the code element when rendered in a user interface (e.g., web browser user interface). In one example, the source-code documents can be used in a web component for cross navigation between source code online. In another example, the source-code documents can be locally stored formatted files that contain source code.

EXAMPLE 13

Exemplary Clustering of Source-Code Query Results

In any of the examples herein, source-code query results can be clustered automatically. Source-code elements corresponding to source-code query results can be input into a clustering algorithm that can automatically identify dominant concepts among the code elements based on semantic properties of the text of the code elements. The clustering can be done automatically using the source-code elements as input and can be done without considering, using, or comparing query terms entered by a user. In some implementations the clustering algorithm can use query terms entered by a user.

Semantic properties of source code elements can be words, keywords, phrases, code statements, concepts, text, or other discrete segments of code. In one example, code index documents associated with source-code query results can include fields with source code text that can be tokenized and mined for keywords dynamically such as at runtime. Concepts can be connected to words or keywords found in the text of a mined source-code element. The concepts can be based on the distribution of words among the various mined code elements. In one implementation, words that are included multiple times in a code element can be keywords. In other implementations keywords can be chosen in some other manner.

In a further example, a clustering algorithm can traverse a suffix tree containing index documents that include the source code of code elements and identify words and phrases occurring more than once in the code elements. Each word and phrase can be used to create a base cluster. Once the base clusters are created, they can be merged to form final clusters. In another example, semantic clustering can be performed based on source code that is a value in a code field in an index document.

In one example, source code query results can be ranked and a number of the highest ranked results can be clustered (e.g. top n results). The index documents associated with the source code query results can be sent to a clustering engine and the source code query results can be clustered based on similar concepts in the text of the code elements.

Clustering of source-code query results can be an unsupervised learning task which classifies a set of observations into subsets such that observations in the same subset are related. This approach can group source-code query results based on content similarity. A clustering algorithm can determine groups of content similarity from code text of code elements without using terms from a query. For example, a clustering technique can automatically determine similarities of text in different code elements and can group the code elements according to those similarities. The clustering technique does not need to use query terms, operators, or terms provided by a user (e.g., in a query field) to group the code elements. The clustering can determine the semantic groups based on properties of the text of the code elements. For example, during clustering different segments of code can be compared and determined to be similar based on their text without considering a query that produced the results that were input for clustering. For example, multiple methods relating to time (e.g., getTime, getDate, changeDateTime) can be compared and included in an identified semantic cluster because of similar concepts in the methods.

A semantic clustering algorithm can be a Suffix Tree Clustering algorithm, Lingo clustering algorithm, or some other clustering algorithm. A clustering engine can also be used for clustering of source-code query results. In one example, Carrot2 search result clustering engine can be used. In other examples, other clustering engines can be used. Semantic clustering can be done online and also in real time when results are obtained.

When semantic clusters are generated they can be cached. For example, for each of a number of semantic clusters, a number of source-code query results can be cached. This can speed up the process of cluster retrieval if the cluster is selected because the results of the clustering have been preserved. If more source-code query results are requested than the cached number of results, then clustering can be redone to return the requested source-code query results. For example, if all the source code query results are paginated in a web interface and only the first page of source-code query results of the cluster are cached, then clustering can be done again to retrieve the subsequent pages of results. However, once clustering has been done the resulting refined source-code query results can be preserved for the source code by caching the results or storing them in some other manner.

EXAMPLE 14

Exemplary Semantic Cluster

In any of the examples herein, a semantic cluster can be a group or subset of source-code query results grouped or categorized based on a similarity of concepts in the code elements of the grouped source-code query results. A semantic cluster can group source-code query results based on context or content similarity. Similar concepts can be determined based on semantic properties of the text of the code elements associated with the query results. In some examples, semantic properties of source code elements can be words, keywords, phrases, code statements, concepts, text, or other discrete segments of code. Concepts can be connected to words or keywords found in the text of a source code element based on the distribution of words among the various mined code elements. For example, a clustering technique automatically determines similarities of text in different code elements and can group the code elements according to those similarities. For example, multiple classes with text that similarly reflect a particular concept can be included in an identified semantic cluster.

Identifying common concepts in code elements can aid in the searching of source code. For example, a person searching for source code can use their knowledge of the type of code they are looking for to choose from among different semantic clusters associated with various concepts to narrow or refine search results in an attempt to find relevant code. Similarities in source code text can indicate concepts such as business concepts, technical concepts, and other concepts.

EXAMPLE 15

Exemplary Semantic Cluster Option

In any of the examples herein, a semantic cluster option can be an option corresponding to a semantic cluster of source-code query results. A semantic cluster option can indicate concepts determined from semantic properties of source-code elements.

A cluster option can have associated cluster information. The cluster information can include a cluster identifier (cluster ID) and a cluster percentage. A cluster identifier can identify a cluster option and indicate the concepts of the corresponding semantic cluster.

The cluster ID can be determined from one or more fields of index documents for code elements associated with the semantic cluster. For example, a semantic cluster of four source-code query results can have a cluster ID that is a combination of words, text, or concepts stored in fields of the index documents of the four code elements. In another example, if a semantic cluster includes multiple source-code query results but only a portion of the indexed code elements have common words in their respective fields (e.g. title fields), then the most common words among the fields of the multiple source-code query results can be used as the cluster ID. In yet another example, if there are two index documents that when mined are found to be similar, a common word or words from the title fields of the index documents can be chosen for use in the cluster ID. In a further example, if there are no words totally common to all of the multiple index document fields, then the most common words among the group can be used in the cluster ID for indicating a concept of the cluster.

A cluster percentage can indicate a percentage of clustered source-code query results that are included in a semantic cluster associated with the cluster option. For example, if a number of source-code query results are clustered, a cluster percentage for one of the resulting clusters can indicate what percent of the number of source-code query results clustered are associated with the resulting semantic cluster.

A semantic cluster option can be included as part of a concept wheel. Cluster options can correspond to a portion of the area of the concept wheel. Cluster options can be shown in the concept wheel so a user can understand which concepts are dominant.

A semantic cluster option can be selected. For example, a user can select a semantic cluster option in a user interface by clicking on the semantic cluster option, clicking on a semantic cluster option selection box or by some other selection method. The semantic cluster option can be associated with query terms and operators that can limit a query. For example, when a semantic cluster option is selected, semantic cluster option query terms and operators can be added to the query terms and operators that were used to generate the semantic cluster option and sent as a new query. A selection of a semantic cluster option selection can also be sent using other techniques such as sending a selection value indicating the selection or other techniques. For example, when a semantic cluster option is selected an indication of the selected semantic cluster option can be sent to a server and cached source-code query results can be returned in response to receiving the indication of the selected semantic cluster option.

EXAMPLE 16

Exemplary Facet Option

In any of the examples herein, a facet option can include one or more facets and one or more facet values. For example, a facet option can include facets that categorize source-code query results and facet values that are associated with groups of source-code query results that can be categorized by facets.

EXAMPLE 17

Exemplary Facet

In any of the examples herein, a facet can be a classification based on a distinct feature or functionality of source code. A facet can be a category or classification based on a source-code attribute. For example, a facet can be a category based on a code attribute of a code element associated with source-code query results. A source-code attribute can be extracted by parsing the code element according to a programming language. The source-code attribute can be based on the text of a code element. A facet can be used to organize or group facet values. For example, in a user interface facet values can be grouped and displayed in groups according to facets. In one implementation a facet can be listed and facet values can be listed under or as a sub listing of the facet.

A facet can be stored in a field of an index document for a code element. For example, when a parser parses a code element for indexing, it can input a facet and facet value into an identifiable field for facet options (facet field). The facet field can be used to determine a facet of the indexed code element when the index document is searched. For example, a search engine can search an index to find index documents with similar facet fields and facet field values.

Facets can be used to localize source-code query results based on attributes of code elements such as classes and methods. This faceted search of source code can use facets of code objects to easily narrow down source-code query results based on additional attributes of code elements. For example, for the Java programming language, "EXTENDS" can be a facet that corresponds to source-code elements with the attribute of extending (e.g., a class). Also for example, the source-code element that extends a class can have "Extends" as part of the syntax or text of the code that can be extracted when parsed. In other examples, a facet can be a category based on a reserved term in a programming language or based on some other syntax or textual element in source code that can be identified in the source code text by parsing the source code according to the syntax of a programming language. For example, for Java objects facets can be based on inheritance, implementing, calls, imports, or the like. These exemplary facets can be "Inheritance," "Implementing," "Calls," "Imports," or other facets based on the programming language. Also, facets can be associated with class dependencies.

In some examples a facet can be associated with an attribute that can be extracted from source code by a parser. For example, in the source code of code element A, a parser can encounter that code element A "implements" code element B and the parser can store or input information in a value or field that indicates code element A implements code element B. For example the parser can store the indication of a code attribute in an index document or some other data store such as a database or the like. In some examples, once a facet is associated with a code element in a data store, the data store can be searched or queried to find the facets associate with the code element. For example, an index document for code element A can be searched for a field that indicates code element A implements other code elements.

A facet can be selected. For example, a user can select a facet in a user interface by clicking on an indication of the facet or by some other selection method. An indication of the facet can be a word, phrase, or user interface element that corresponds with the facet. For example, the facet "implements" that is a categorization of code elements that implement other code elements can be sent to a user interface and displayed. The facet can be selected by selecting a user interface element that includes an indication of the facet such as the word "implements" or some other indication that the user interface element corresponds to the facet. When the facet is selected facet values that correspond to the facet can be displayed as options. For example, if the implements facet is selected, facet values that correspond to source-code query results that retrieve code elements that implement other code elements can be displayed. A facet can include or have a sub categorization of one or more facet values.

In another example, facets can be designated for facet fields of index documents. For example, an index document for a class code element can have a facet field that is designated as "classname" which can be associated with a value of the name of the class. Table 1 shows facets that can be designated for facet fields. Other facets can be determined and extracted based on the syntax of programming languages and written source code.

TABLE 1

| Facet Fields |
| --- |
| Facet Fields |
| calls |
| classname |
| creates |
| extends |
| implements |
| imports |
| methodname |

EXAMPLE 18

Exemplary Facet Value

In any of the examples herein, a facet value can be associated with a group of source-code query results categorized under a facet. A facet value can be associated with a sub classification of source-code query results based on a distinct feature or functionality of source code. A facet value can be based on a source-code attribute. A facet value can group or be associated with a group of source-code query results.

A facet value can include a code element identifier and a results indicator. A code element identifier can be associated with source-code query results that include code elements with a particular attribute. For example, a code element identifier can be associated with query results corresponding to classes that implement a particular interface. The code element name, name variation or other identifier of the code element can be included in the code element identifier.

A results indicator can indicate the number of source-code query results included in the group for the facet value. For example, the results indicator can give the number of hits within source-code query results that match the category of the code element identifier.

A code attribute that can be associated with a facet value can be stored in a field of an index document for a code element. For example, when a parser parses a code element for indexing, it can input a facet and code attributes for one or more facet values into an identifiable field for facet options (facet field). The facet field can be used to determine a facet value of the indexed code element when the index document is searched in the index. The values, information, or text of the facet field can be code attributes, facets, identifiers of code elements, indications of functionality of a code element, or other information that can be used as a categorization for a facet value. For example, some of the information of the value of the facet field can be used as a code element identifier or used to match or group code elements with similar attributes for determining a facet value. In a further example, an identifier of a code element in a facet field can be used to match or group the indexed code element with other similarly attributed code elements. The identifier of the code element or a variation of it can be used as the code element identifier in the facet value displayed in a user interface.

A facet value can be selected. For example, a user can select a facet value in a user interface by clicking on the facet value, clicking on a face value selection box or by some other selection method. The facet value can be associated with query terms and operators that can limit a query. For example, when a facet value is selected the facet value query terms and operators can be added to the query terms and operators that were used to generate the facet value and sent as a new query. A facet value selection can also be sent using other techniques such as sending a selection value indicating the selection or other techniques.

More than one facet value can be selected to refine source code query results. For example, if more than one facet value is selected, the selected facet values can be used to limit the source-code search results. In yet another example, the intersection of the results associated with the facet values can be returned as the refined source-code query results. In a further example, the selected facet values can limit results in combination with selected semantic clusters, and a user entered query.

EXAMPLE 19

Exemplary Method of Employing a Combination of the Technologies

Figure 10:
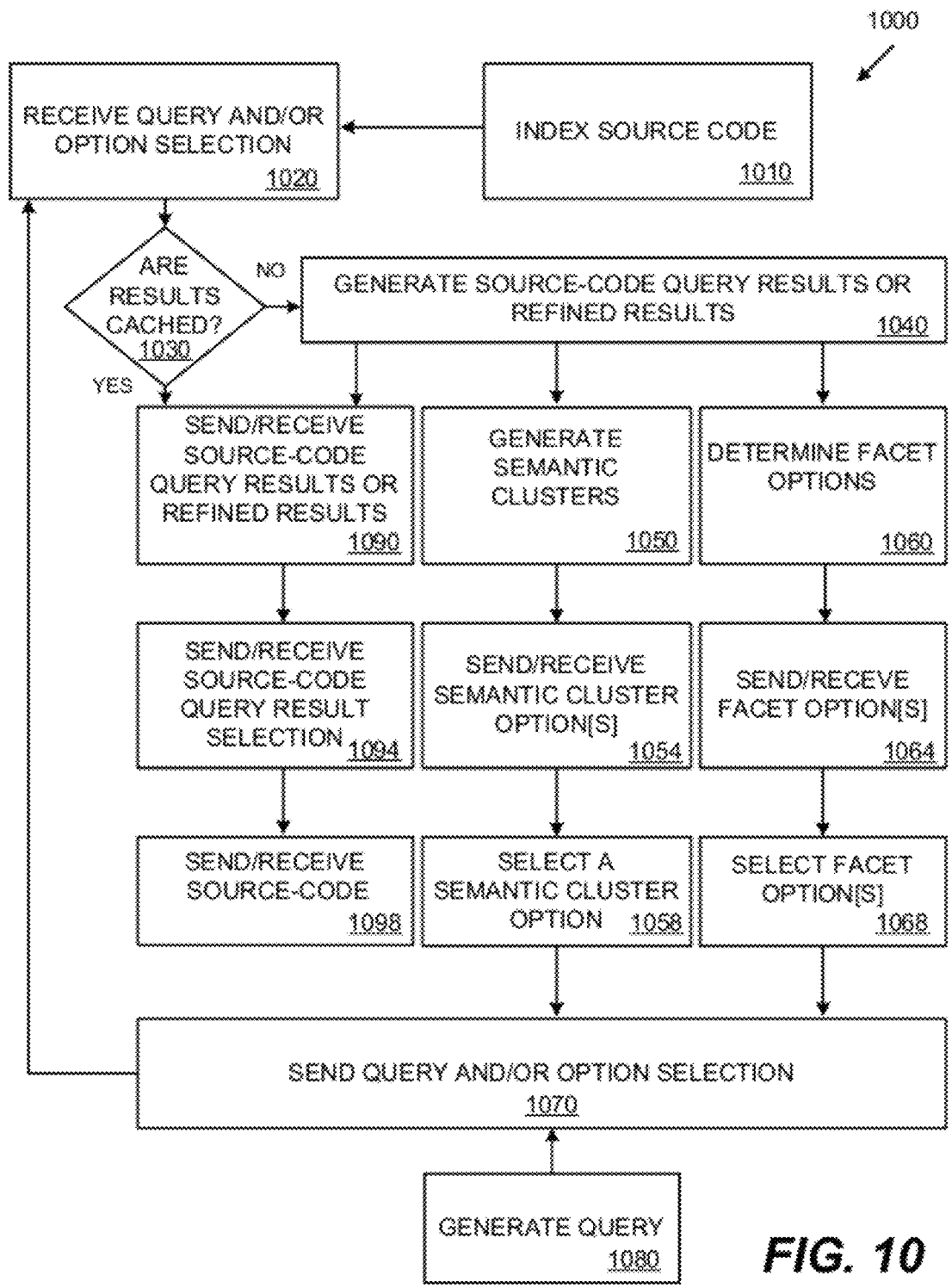
FIG. 10 is a flowchart of an exemplary method of searching for source code.

FIG. 10 is a flowchart of an exemplary method 1000 of searching for source code. At block 1010, source code can be indexed. At block 1020, a query or option selection or both can be received. At decision block 1030, it is decided if refined source-code query results are cached. If the source code query results are not cached, source-code query results or refined source-code query results can be generated at block 1040.

At block 1050, on or more semantic clusters can be generated. At block 1060, one or more facet options can be determined. The semantic clusters and facet options can be generated or determined using different or parallel threads or using a single thread.

At block 1054, the semantic cluster options can be sent or received. For example semantic cluster options can be sent and then received. At block 1064, facet options can be sent or received. At block 1090, source-code query results or refined source-code query results can be sent or received. Each of the source-code query results, the semantic cluster options, and the facet options can be sent or received in parallel or asynchronously of each other. For example, the source-code query results and semantic cluster options can be sent after the source code query results are sent.

At block 1058, a semantic cluster option can be selected. In one exemplary implementation one semantic cluster option (e.g., only one) can be selected. In another exemplary implementation, for example more than one semantic cluster option can be selected. At block, 1068 one or more facet options can be selected.

At block 1070, selected options or a query can be sent. For example, a user can select a semantic cluster option or a facet option and it can be sent along with a query. A facet option can include one or more facets, and one or more facet values. The query can be the same or similar to the query that was received at 1020 along with the option selections as limitations of the query. The query can be generated at block 1080. For example, a user searching for source code can generate a query for source code search results.

At block 1094, a source code query result selection can be sent or received. For example, when source code query results are received, a user can select one of the source code query results. At block 1098, the source code corresponding to the selected source-code query result can be sent or received. For example when the user selects a source-code query result the corresponding source code is sent in a formatted html document and received for the user to view in a web browser or user interface.

EXAMPLE 20

Exemplary System for Searching for Source Code Online

Figure 11:
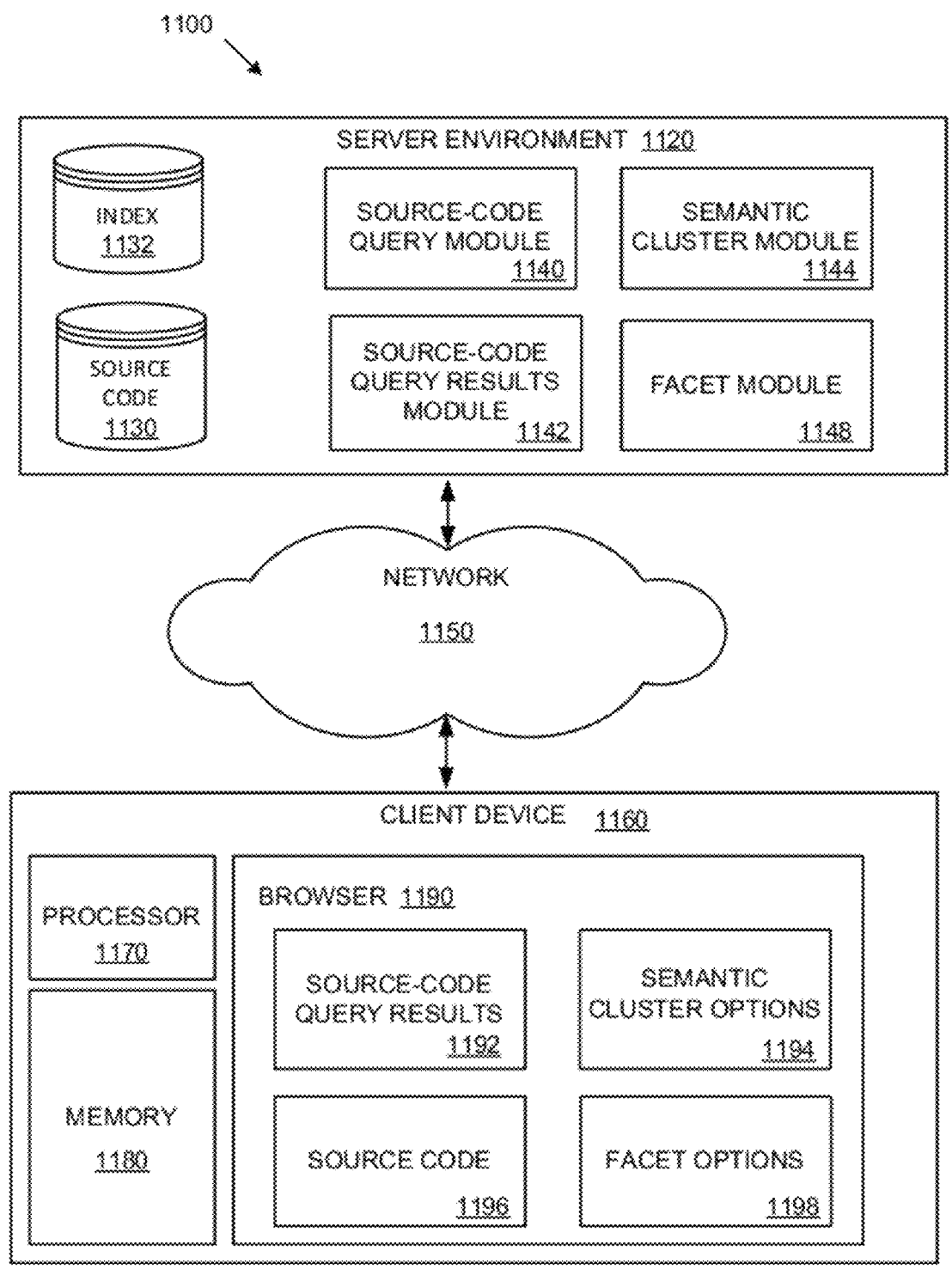
FIG. 11 is an exemplary system for searching for source code online.

FIG. 11 is an exemplary system 1100 for searching for source code online. The system 1100 includes a server environment 1120. For example, the server environment 1120 can include web servers, database servers, search servers, and other hardware and/or software resources. In the example, source code 1130 and a source code index 1132 are stored in the server environment 1120. Server environment 1120 can also include a source-code query module 1140, semantic cluster module 1144, source-code query results module 1142, and a facet module 1148. The source-code query module 1140 can be for receiving source code queries and option selections. The semantic cluster module can be for determining semantic cluster options and sending semantic cluster options. The facet module 1142 can be for identifying facet options and sending facet options. The source-code query results module can be for determining and sending source-code query results or refined source-code query results. In one implementation of the server environment it can be a query service and implement the functionality of a query service.

The server environment 1120 is connected to a network 1150. For example, the network 1150 can be a global communication network, such as the Internet. The network 1150 can represent various network resources that are needed for end-to-end communication between the server environment 1150 and one or more client devices (e.g., client device 1160). For example, the network 1150 can represent the Internet in combination with other types of networks, such as mobile phone networks (e.g., cell phone networks), Wi-Fi networks, and the like.

The server environment provides source-code search results and options to client devices such as client device 1160. Client device 1160 can include a processor 1170, memory 1180, a web browser 1190 (e.g., Internet Explorer®). The web browser 1190 can receive and display source code query results 1192, semantic cluster options 1194, source code 1196, and facet options 1198. The browser 1190 can also send source-code queries and selections of semantic cluster options and facet options.

EXAMPLE 21

Exemplary Client User Interface

Figure 12A:
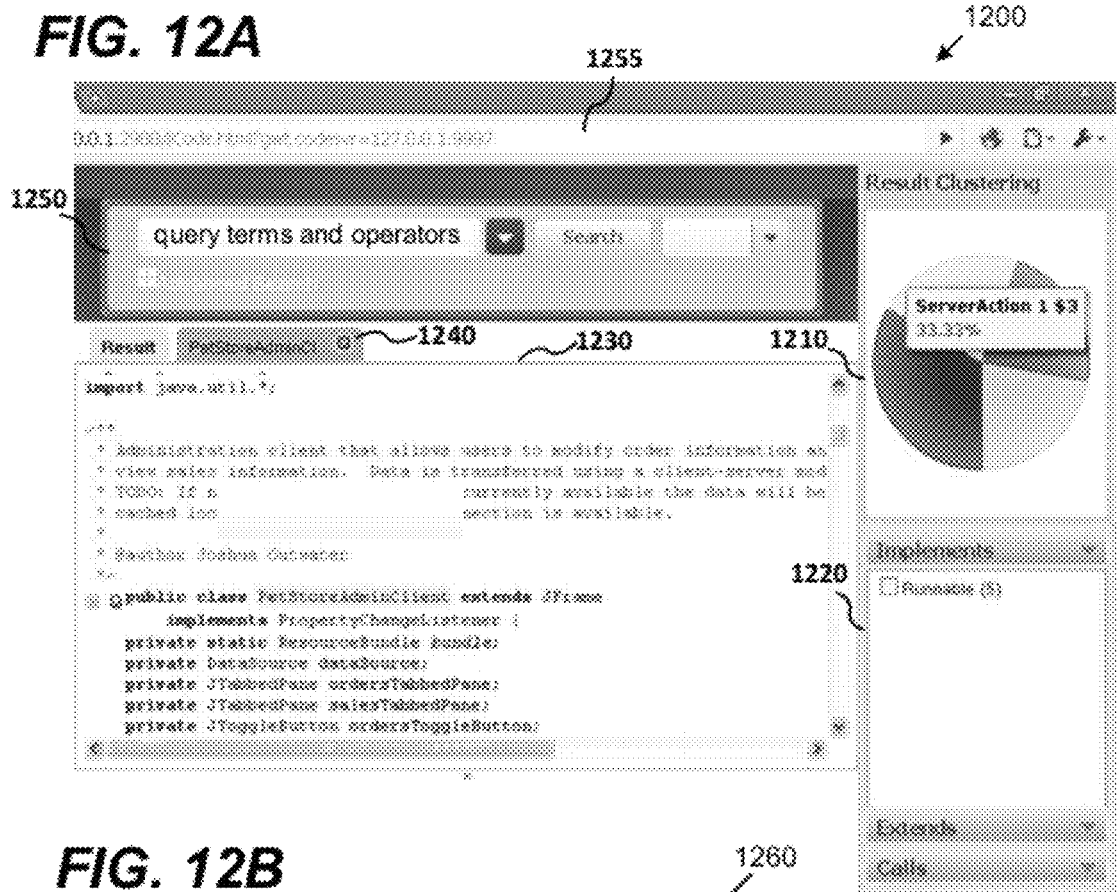
FIG. 12A illustrates an exemplary client user interface.

FIG. 12A illustrates an exemplary client user interface 1200. The client user interface 1200 can include a result clustering user interface 1210, and a faceted search user interface 1220. The client user interface 1200 can be a web interface in a web browser.

Figure 12B:
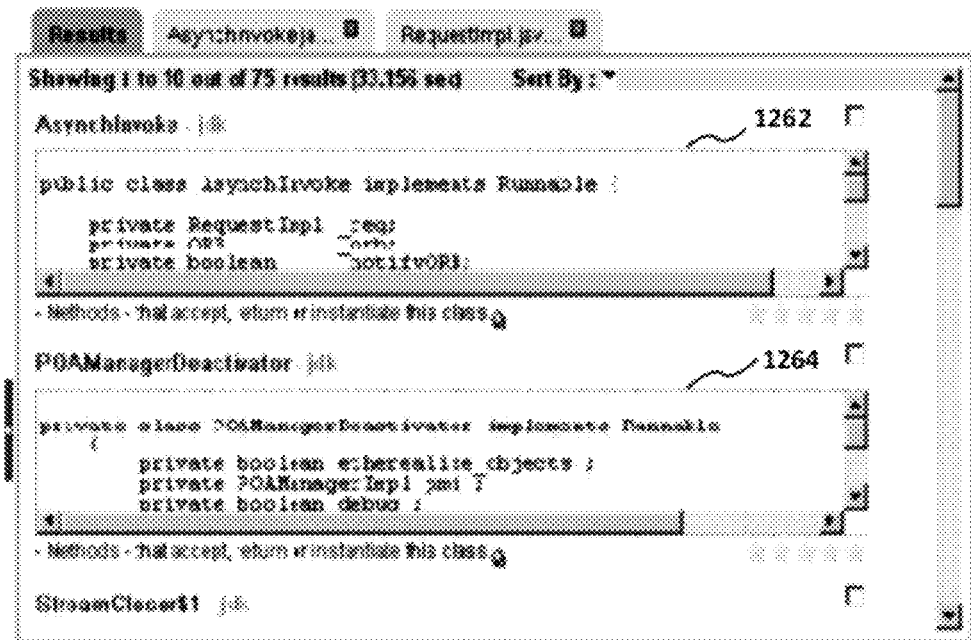
FIG. 12B illustrates an exemplary source-code query results window.

The client user interface 1200 can also include windows for source-code such as source code window 1230. The client user interface can also include windows for source-code query results such as source-code query results window 1260 of FIG. 12B. For example, a user can select the source code search result tab 1240, and the window 1260 with one or more source-code search results such as source-code query results 1262 and 1264 can be displayed.

The client user interface 1200 can also have a search window 1250 for generating and sending queries for searching source code. For example, a user can input text (e.g. query terms and operators) in a query field of the search window 1250 and send the query by selecting the search button.

The client user interface can also have an address field for directing the client user interface to an online resource. For example, the client user interface can be implemented in web browser and the address field 1255 can be used for an internet address that allows access to an online source-code search environment.

EXAMPLE 22

Exemplary Method for Refining Source-Code Query Results

Figure 13:
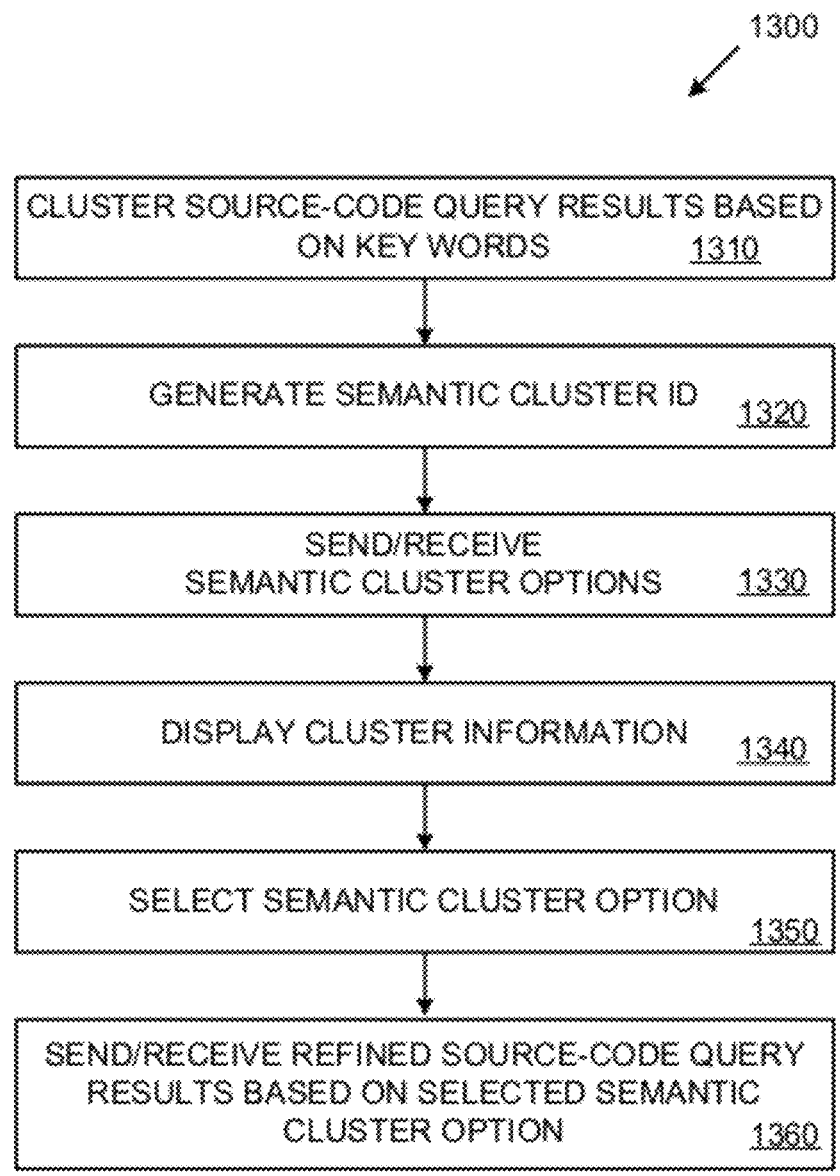
FIG. 13 is a flowchart of an exemplary method for refining source-code query results using cluster information.

FIG. 13 is a flowchart of an exemplary method for refining source-code query results. In the example, source-code query results are clustered based on key words found in code elements at block 1310. For example, semantic clusters of the source code query results can be generated based on keywords found in indexed source code.

At block 1320, semantic cluster identifiers are created. For example, each of the generated semantic clusters can be associated with a semantic cluster identifier that indicate a concept based on similar entries in fields of indexed documents.

At block 1330, semantic cluster options are sent or received. For example generated semantic cluster options can be sent from a server and received by a client.

At block 1340, cluster information is displayed. For example, the cluster information can be displayed to a user when the user activates the information for a semantic cluster. The cluster information can be activated when a cursor hovers over a semantic cluster option.

At block 1350, a semantic cluster option can be selected. For example, a user can select a semantic cluster option by mouse clicking on the semantic cluster option displayed in a user interface.

At block 1360, based on the selected semantic cluster option, refined source-code query results can be sent or received. For example, a user can select a semantic cluster option and then refined source-code query results that are limited by the selected semantic cluster can be received.

EXAMPLE 23

Exemplary Method for Refining Source-Code Query Results

Figure 14:
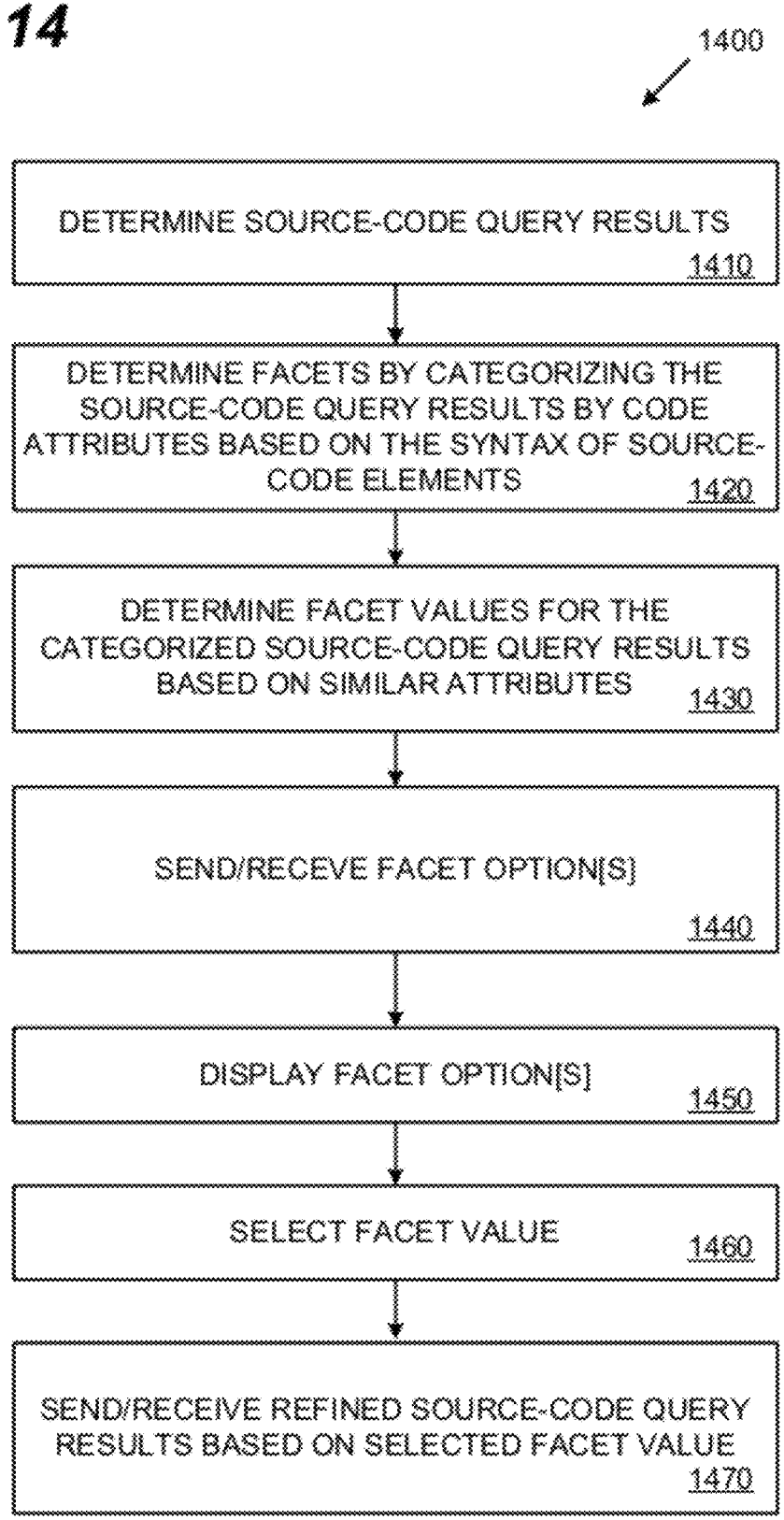
FIG. 14 is a flowchart of an exemplary method of refining source-code query results using facet values.

FIG. 14 is a flowchart of an exemplary method 1400 of refining source-code query results. In the example, source-code query results can be received at block 1410. For example, the source-code query results can be determined in response to a source-code query.

At block 1420 one or more facets can be determined by categorizing the source-code query results by code attributes based on the syntax of source-code elements. In one example, the source code query results can be categorized or grouped because they correspond to code elements that have the attribute of implementing as indicated by the syntax of code of the code element. In other examples, different facets can be determined based on code attributes based on the syntax of code elements.

At block 1430, one or more facet values can be determined for each of the facets that categorize the source-code query results. The facet values can be determined based on the query results within each facet that have similar attributes. For example, a facet value can correspond to the source-code query results grouped under a facet that implement the same interface.

At block 1440, facet options are sent or received. For example, a server can send facets and facet values to be received by a client.

At block 1450, one or more facet options can be displayed. For example, facets and facet values can be displayed in a user interface.

At block 1460, one or more facet values can be selected. For example, a user can select a facet to determine facet values grouped under the facet and the user can select one or more of the facet values and an indication of the selected facet values can be sent to a server.

At block 1470, refined source-code query results are sent or received based on selected facet values. For example, when a server receives an indication of a selected facet value source-code query results can be refined by limiting the source code query results to the results that are associated with the selected facet value.

EXAMPLE 24

Exemplary System for Refining Source-Code Query Results Using an Index

Figure 15:
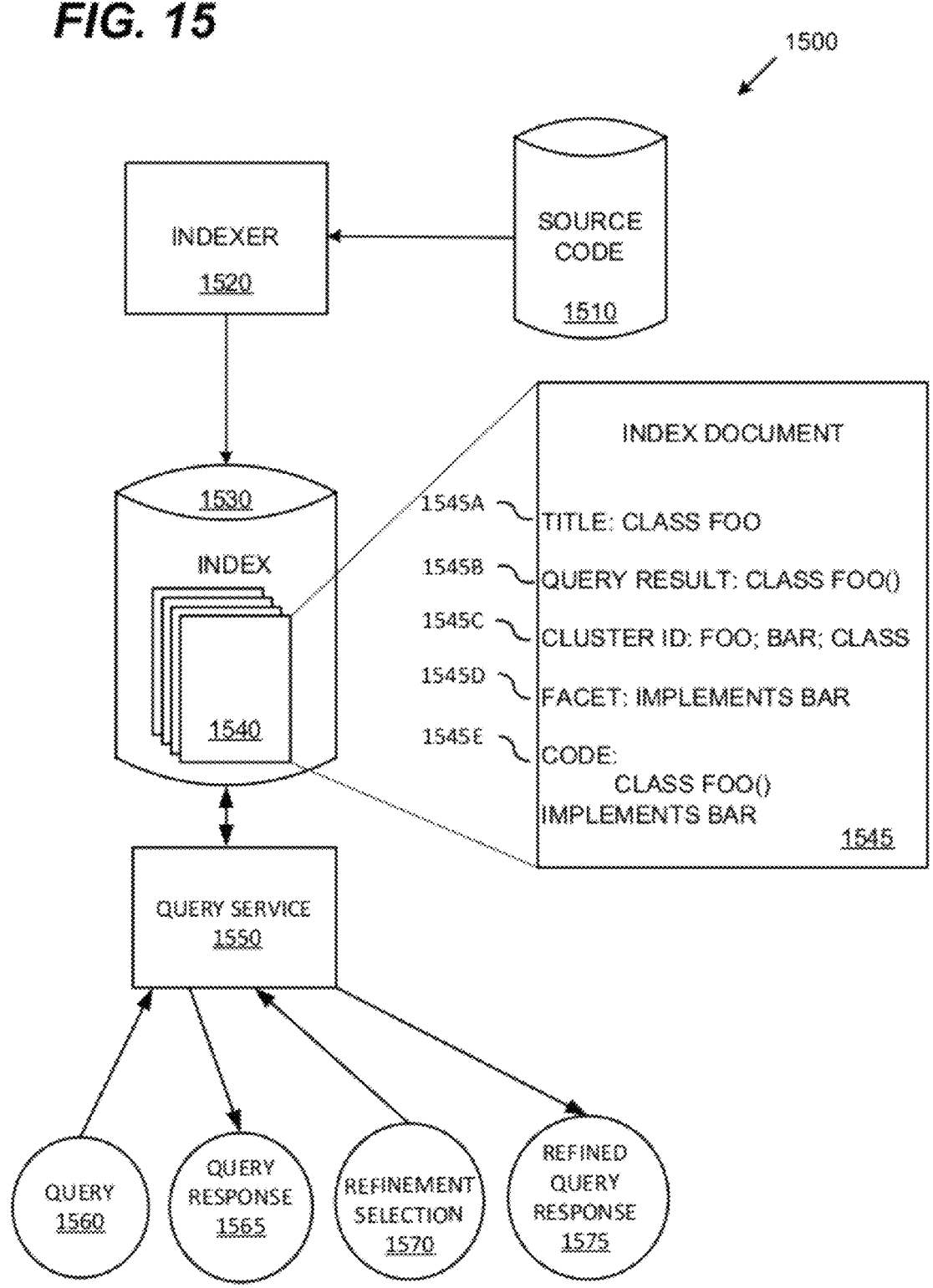
FIG. 15 is a diagram of an exemplary system for refining source-code query results using an index of source code.

FIG. 15 is a diagram of an exemplary system 1500 for refining source-code query results using an index of source code. In the system 1500, source code 1510 can be indexed by indexer 1520 and stored in index 1530. Indexer 1520 can create index documents 1540 based on code elements. An index document 1545 can have fields with values that have been populated by indexer 1520.

The indexer 1520 can populate index document fields by parsing source code based on a programming language. For example, source code written in a programming language can be parsed according to that language to find code elements. Those code elements can then be parsed so that values of the index document can be populated based on the code syntax and text.

The index documents 1540 can have fields such as the fields of index document 1545. In index document 1545 there can be a query result field that includes text for a source-code query result that can be displayed. Also index document 1545 can include a code field 1545E that includes the code of the code element. The index document 1545 can include a cluster identification field 1545C that can include words, data, or information used in determining a cluster ID.

The index document 1545 can have a facet field 1545D that includes information about facets that are associated with the code element of the index document 1545D. For example, the facet field 1545D can list code attributes found in code of the code element of the index document. The facet field 1545D can also include information about facet values that are associated with the code element of the index document 1545. The index document 1545 can include a title field 1545A that can hold the title of a code element. The title field 1545A can be extracted from a document title of a source-code document where source code is written, or from code element text. Variations of the extracted text can be used such as removing unnecessary words.

In the exemplary system 1500 a query service can use the index 1530 to refine source code-search results. A query 1560 can be sent to the query service and the query service can use the index to return a source-code query response 1565. A refinement selection can be sent to the query service 1550 and the query service 1550 can use the index 1530 to return a refined source-code query response 1575.

EXAMPLE 25

Figure 16:
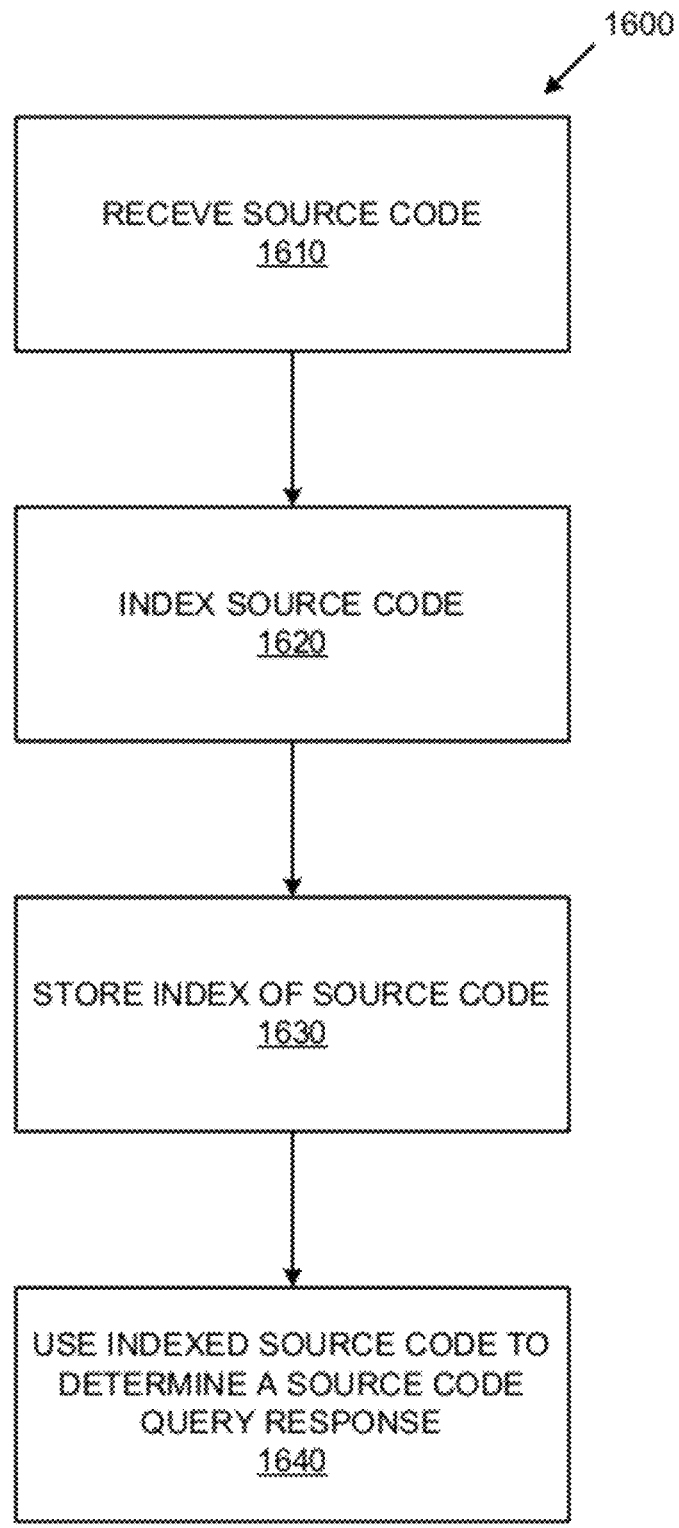
FIG. 16 is a flowchart of an exemplary method for using an index of source code to determine source-code query responses.

Exemplary Method for Using an Index of Source Code to Determine a Source-Code Query Response FIG. 16 is a flowchart of an exemplary method 1600 for using an index of source code to determine one or more source-code query responses. In the exemplary method, source code can be received. For example, source code can be received by an indexer that parses the source code based on a programming language.

At block 1620, source code can be indexed. For example, source code can be parsed according to a programming language and code elements can provide values for fields of index documents.

At block 1630, the index of source code can be stored. For example, the indexed source code can be stored in an index.

At block 1640, indexed source code can be used to determine a source code query response. For example, fields of index documents of the indexed source code can be searched or queried to determine facets, facet values, semantic clusters, cluster identifiers, source-code search results, and refined source-code search results.

EXAMPLE 26

Exemplary Architecture for Employing a Combination of the Technologies

Figure 17:
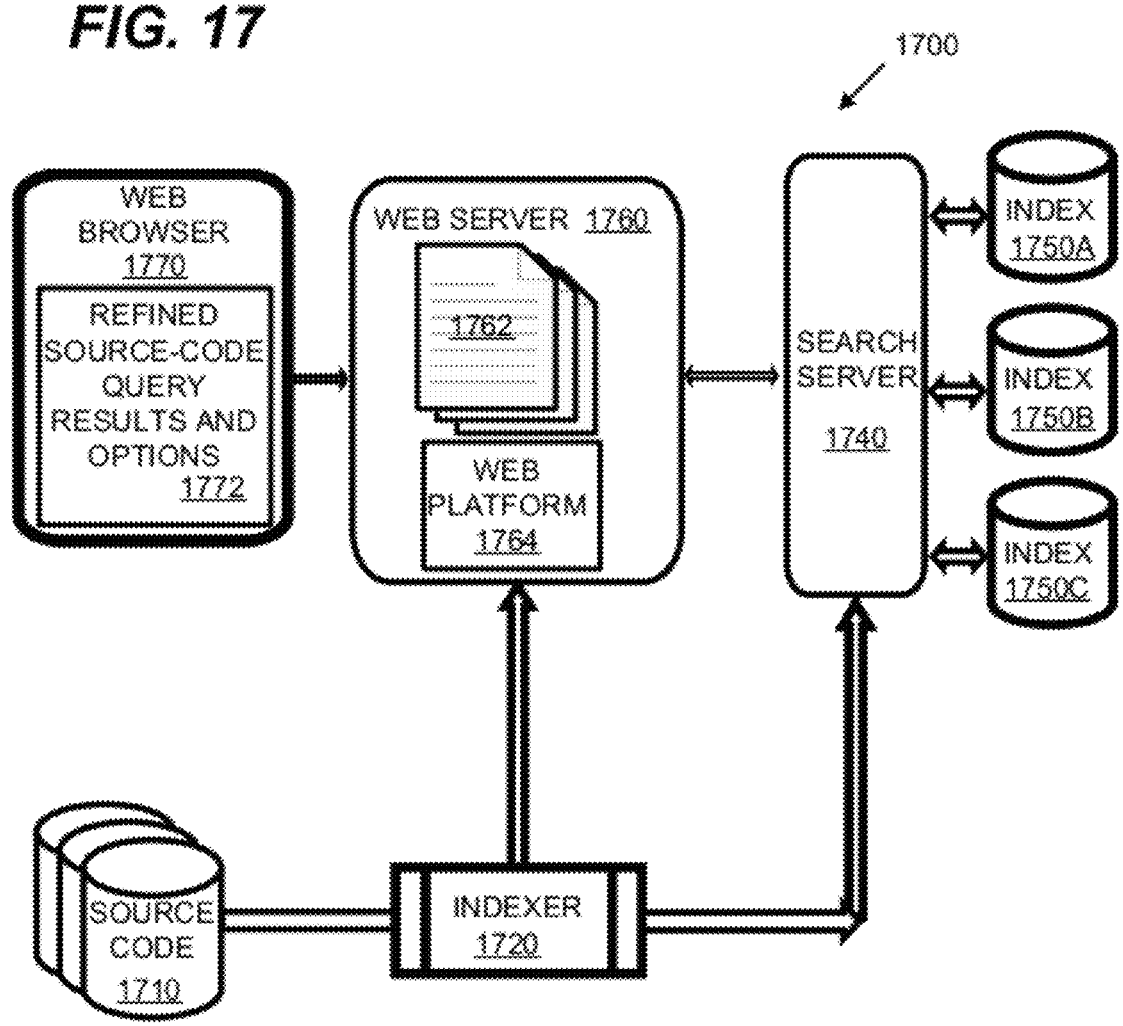
FIG. 17 is a diagram of an exemplary architecture for refining source code search results.

FIG. 17 is a diagram of an exemplary architecture 1700 for refining source code search results. The architecture can be scalable. The Java programming language can be used as a language of the source code searched using the architecture, however, support of other programming languages can be added by adding a parser for other languages which can extract and store the corresponding code elements into an index and that can generate smart HTML versions of source code files.

In the architecture 1700, source code 1710 can be indexed by indexer 1720. The indexer 1720 can parse source code according to a programming language. In one embodiment of the indexer, the indexer 1720 can use the Eclipse JDT parser to parse source code or some other parser can be used. Indexed code elements with attributes and dependencies can be stored in one or more indexes 1750A-C accessible to search server 1740. The indexer 1720 can also produce source-code documents 1762. The source code documents can be intelligently formatted HTML files which are used in a web component for cross navigation between the sources online. Source code documents 1762 can be accessed by web browsers such as web browser 1770. Also, refined source-code query results and options 1772 can be displayed in web browser 1770.

The search server 1740 can search the index of code elements of source code. In one embodiment, the search server 1740 can be implemented through Apache Solr server or some other server. In one example embodiment, the search server 1740 can both store and retrieve the information through a common application programming interface (API) or by some other technique. The search server 1740 can be configured to support either semantic cluster based search or facet based search or both. For example, the search server 1740 can refine source code search results based on selected facet options or selected semantic cluster options. The search server can interact with a web server 1760 with web platform 1764 to be a query service and provide the functionality of a query service for refining source-code search results 1772.

EXAMPLE 27

Exemplary Code Element

In any of the examples herein, a code element can be a portion of the text of source code that can be designated from the syntax of a programming language. For example, a code element can be a class, a method, a function, routine, a statement, or other like logical code element. Code elements can be hierarchical combinations of code elements. For example, both a designated method of a class and the class itself that includes the method can be different code elements. Also, for example, code element can be source code comments which are designated by a comment marker. A code element can be a combination of other code elements. For example, a code element can be a comments section of a class, the class, or both the comments and the class. A source code element can be created for the contents of a source code file or a portion of the contents. For example, a class that is written in a source code file or document can indexed as a code element.

A code element can be determined, identified, or extracted by parsing source code according to the syntax of a programming language. A code element can have attributes that can be identified or determined by and indexer. For example, an indexer can parse source code written in the C++ programming language according to the syntax of the language to extract code elements, such as classes, functions and the like. Attributes of the code elements can be used to create index documents with information about the code elements. In one implementation, code elements can be identified and extracted because a parser can identify the beginning, end and body of a class based on the syntax of the programming language. In another example, code elements can be discrete segments of source code that can be searched for by a user.

EXAMPLE 28

Exemplary Source-Code Query

In any of the examples herein, a source-code query can include query terms operators and limiters. Query terms can be text, words, phrases, or character strings. A source-code query can include operators, such as Boolean operators such as "AND," "OR," and "NOT," or other operators. In one example of a query, a user searching for source code can enter the query "classname:server AND methodname:send." This query can return classes with the word server in the class name and that have a method with send in the method name. In other examples, other queries can be created using different query terms and query syntaxes.

The source-code query terms can be arranged according to a syntax. For example, if a user wanted to search for a class named Foo the query for the search can be classname:Foo. Where classname indicates a code element type and Foo separated by a colon can indicate the name of the class or a textual portion of the class. Other textual arrangements or syntaxes can be used however. For example, a query that matches text terms can be used.

Query terms, operators, or limiters for a source-code query can be entered by a user, or automatically. For example, a user can enter query terms into a text or query field of a user interface to search for source code.

In another example, query terms, operators, or limiters can be automatically entered into a source-code query. For example, a user can select a facet option or a semantic cluster option and a query term, operator, or limiter indicating the selection can be automatically added to a source-code query.

In one example, when a facet value is selected an indication of the selected facet value and corresponding facet can be added to a query as query terms that further limit the query. For example, for a facet value that implements interface foo, the automatic query terms and operators can be "AND Implements:foo." These query terms and operators can limit the source-code search results for the query to results that correspond to code elements that implement the interface foo.

In another example, when a cluster option is selected an indication of the selected semantic cluster option can be added to a query as query terms that further limit the query.

EXAMPLE 29

Exemplary Source-Code Query Response

In any of the examples herein, a source-code query response or query response can include source-code query results, facet options, semantic cluster options, facet values, or facets. For example, in response to a query from a user searching for source code, a source-code query response can be sent including source-code query results, semantic cluster options, and facet options as choices for selection by the user.

EXAMPLE 30

Exemplary Source-Code Query Result

In any of the examples herein, a source-code query result can be a result determined in response to a source-code query. A source-code query result can be used to retrieve or reference source code, a code element, or an index document. For example, a user can select a source code query result by mouse clicking on the source-code query result and the selection can retrieve the associated code element.

The source-code query result can be displayed in a user interface at a client. In one implementation, source-code query results can be implemented in part as links in a in a web page displayed in a web browser or user interface using internet technologies such as HTML, hyperlinks or other internet technologies. A source code query result can include an identifier of the source code or element that it can retrieve. Also, a source code query results can include a portion or all of the text of the code element. For example, the code structure query result can display the first 100 characters of the source code element so that a user can preview the source code. A source code query result can include a hyperlink to retrieve a html document containing the source code or code element. Also, for example a user searching for source code can view or scroll through source-code query results to view available source code hits.

A source-code query result can be ranked and displayed or listed in an order of relevance. An order of relevance can be determined by a ranking based on a heuristic that determines relevance. For example, source-code query results can be ranked based on an algorithm such as a statistical algorithm or some other algorithm where a query is matched with source code or a source code element. Source-code query results can be paginated and displayed in various pages that can be accessed by selecting a pagination option, such as a next page, numbered page, or the like. Also, source-code query results can be displayed in a single page or window.

EXAMPLE 31

Exemplary Refined Source-Code Query Results

In any of the examples herein, refined source-code query results can be a subset, subgrouping, categorization, group, or limited combination of source-code query results from a larger group of source-code query results. For example, if a query produces a large number of source-code query results, the results can be refined to a smaller number of those results. In some examples, refining source-code query results can be based on facets, facet values, semantic clusters, semantic cluster options, or a combination of the factors. In other examples, source-code query results can be refined based on other considerations, such as those described herein.

Refined source-code query results can be based on one or more selected semantic cluster options and one or more selected facet value selections. For example, a facet value can be selected and a semantic cluster option can be selected and the refined source-code query results returned can be the intersection of the results associated with the selected facet value and the selected semantic cluster option.

EXAMPLE 32

Exemplary Generation of Source-Code Query Results

In any of the examples herein, source-code query results can be generated based on a source-code query or selected options such as facet options or semantic cluster options. Source-code query results can correspond to a limited number of results that conform to the limitations of a query. For example, a search server can search indexed source code to identify source code that conforms to the limitations of the query and return the associated source-code search results. The limitations can be determined by query terms and operators. Also indications of selections can limit source-code search results such as in refined source-code search results.

EXAMPLE 33

Exemplary Code Attributes

In any of the examples herein, a code attribute can be an attribute of a code element that can be determined from parsing the text of the code element according to a programming language. For example, a method can have the attribute of calling another method. This can be determined from the text of the code element because the first method can have code text that calls the second method or indicates that it can call the second method.

A code attribute can be associated with some functionality or identifier of the source-code or code element. For example, one code attribute can be that the code element implements some functionality. Another example code attribute can be that the code element calls another code element (e.g. a class, method, function). Another code attribute can be that the code element is a class or method identified by a class or method name. Other examples of code attributes can be that a code element has functionality that creates, extends, or imports a specific code element or function. Other code attributes can be determined by a parser depending on the source code and the programming language it is written in.

EXAMPLE 34

Exemplary Index Document

In any of the examples herein, an index document can be an index of a code element. An index document can include fields with field values. An index document can include a query results field that includes a source-code query result. An index document for a code element can have fields for facets, facet values, cluster identifiers, the text of the code element, an identifier of the code element, dependencies of the code element, and other attributes of the code element. For example, an index document can include a cluster identification field that can include words, data, or information used in determining a cluster ID for a cluster that includes the source-code search result of the index document. An index document can include other fields such as a title field, cluster ID field, facet field, code field, and other fields of the like.

EXAMPLE 35

Exemplary Source Code

In any of the examples herein, source code can be any software source code or portion of source code written according to an object-oriented programming language or a non-object-oriented programming language. For example, source code can be written in C, C++, C#, Java, Basic, Fortran, Lisp, Prolog, Perl, scripting languages, and the like.

In some examples, source code can be represented by a model, an intermediate representation of the source code, or the like. A representation of the source code can be used in place of the source code in any of the examples herein.

EXAMPLE 36

Exemplary Selection

In any of the examples herein, a selection can be a selection of a facet option, semantic cluster option, facet, or facet value.

A selection can be sent. For example, an indication of a selection can be sent in a query as one or more query terms, one or more operators, or a combination of query terms and operators. In one example, when a facet value is selected an original query is augmented to include query terms and operators that limit and refine source-code query results. These refined results can be the intersection of the source-code query results determined from the original query terms and operators and the augmented terms of the facet value selection.

Also, for example, a selected option can be sent by other techniques such as with a selection value, or some other technique. For example, when a semantic cluster option is selected an indication of the selected semantic cluster option can be sent to a server and cached source-code query results can be returned in response to receiving the indication of the selected semantic cluster option.

EXAMPLE 37

Exemplary Advantages

Narrowing query results using facets and semantic clusters offers users an efficient and comprehensive way to search source code. Searching source code using faceted search and semantic cluster based search can easily narrow down query results. The results classification and clustering help the user to make better judgments about the code elements found. The user need not re-tune the query repeatedly. The user can focus on query results instead of query construction.

Faceted search can group query results dynamically into categories. The grouped query results can then be provided to a user as options for drilling down into the query results. For example, a user can choose from different facet values so that a large number of results can be narrowed down based on code attributes and a user's knowledge of the source code desired. Selection of facets and facet values allows users to narrow the results of a query by applying constraints to the query provided by the user.

Semantic cluster based search can also group query results dynamically into categories. The semantic cluster options can be provided to a user as options for refining source code query results based on concepts automatically identified among the clustered results.

EXAMPLE 38

Exemplary Computing Device

The techniques and solutions described herein can be performed by software and/or hardware of a computing environment, such as a computing device. For example, computing devices include server computers, desktop computers, laptop computers, notebook computers, netbooks, tablet devices, mobile devices, and other types of computing devices (e.g., devices such as televisions, media players, or other types of entertainment devices that comprise computing capabilities such as audio/video streaming capabilities and/or network access capabilities). The techniques and solutions described herein can be performed in a cloud computing environment (e.g., comprising virtual machines and underlying infrastructure resources).

Figure 18:
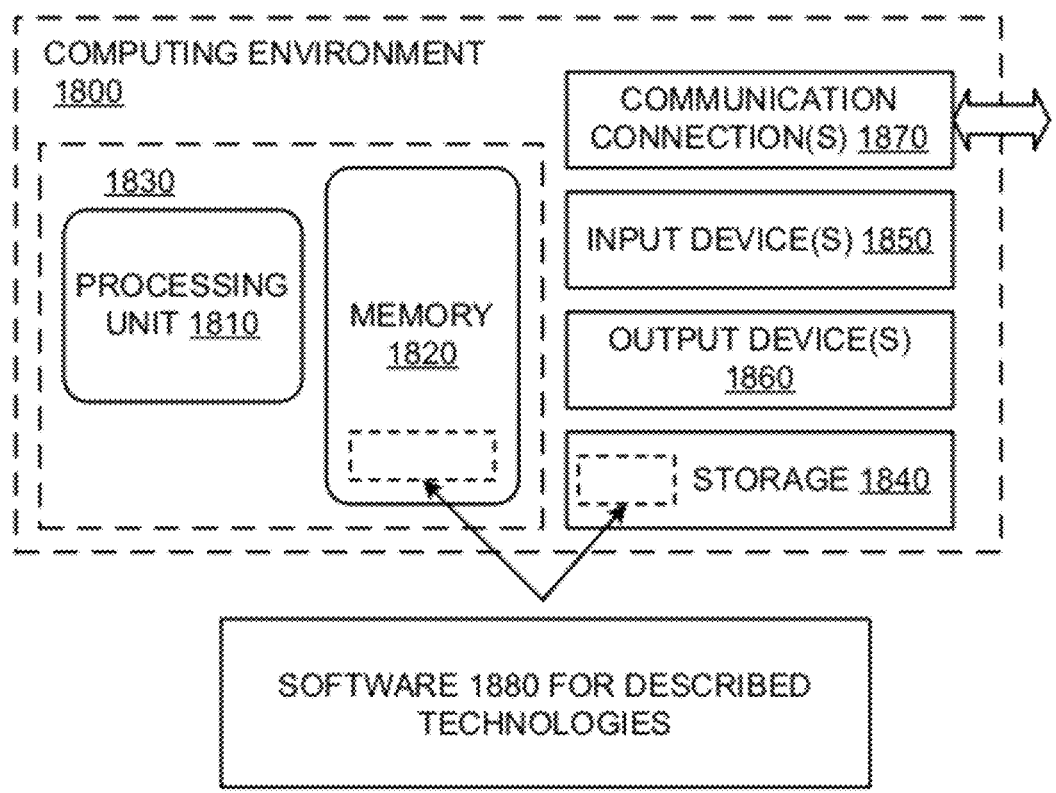
FIG. 18 illustrates a generalized example of a suitable computing environment in which described embodiments, techniques, and technologies may be implemented.

FIG. 18 illustrates a generalized example of a suitable computing environment 1800 in which described embodiments, techniques, and technologies may be implemented. The computing environment 1800 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, or the like. The disclosed technology may also be practiced in distributed computing environments where tasks are performed by remote processing devices that are linked through a communications network. In a distributed computing environment, program modules may be located in both local and remote memory storage devices.

With reference to FIG. 18, the computing environment 1800 includes at least one central processing unit 1810 and memory 1820. In FIG. 18, this most basic configuration 1830 is included within a dashed line. The central processing unit 1810 executes computer-executable instructions. In a multi-processing system, multiple processing units execute computer-executable instructions to increase processing power and as such, multiple processors can be running simultaneously. The memory 1820 may be volatile memory (e.g., registers, cache, RAM), non-volatile memory (e.g., ROM, EEPROM, flash memory, etc.), or some combination of the two. The memory 1820 stores software 1880 that can, for example, implement the technologies described herein. A computing environment may have additional features. For example, the computing environment 1800 includes storage 1840, one or more input devices 1850, one or more output devices 1860, and one or more communication connections 1870. An interconnection mechanism (not shown) such as a bus, a controller, or a network, interconnects the components of the computing environment 1800. Typically, operating system software (not shown) provides an operating environment for other software executing in the computing environment 1800, and coordinates activities of the components of the computing environment 1800.

The storage 1840 may be removable or non-removable, and includes magnetic disks, magnetic tapes or cassettes, CD-ROMs, CD-RWs, DVDs, or any other tangible storage medium which can be used to store information and which can be accessed within the computing environment 1800. The storage 1840 stores computer-executable instructions for the software 1880, which can implement technologies described herein.

The input device(s) 1850 may be a touch input device, such as a keyboard, keypad, mouse, pen, or trackball, a voice input device, a scanning device, or another device, that provides input to the computing environment 1800. For audio, the input device(s) 1850 may be a sound card or similar device that accepts audio input in analog or digital form, or a CD-ROM reader that provides audio samples to the computing environment 1800. The output device(s) 1860 may be a display, printer, speaker, CD-writer, or another device that provides output from the computing environment 1800.

The communication connection(s) 1870 enable communication over a communication medium (e.g., a connecting network) to another computing entity. The communication medium conveys information such as computer-executable instructions, compressed graphics information, or other data in a modulated data signal.

EXAMPLE 39

Exemplary Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable media (tangible computer-readable storage media, such as one or more optical media discs, volatile memory components (such as DRAM or SRAM), or nonvolatile memory components (such as hard drives)) and executed on a computing device (e.g., any commercially available computer, including smart phones or other mobile devices that include computing hardware). By way of example, computer-readable media include memory 1820 and/or storage 1840. As should be readily understood, the term computer-readable media does not include communication connections (e.g., 1870) such as modulated data signals.

Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to a particular type of hardware. Certain details of suitable computers and hardware are well known and need not be set forth in detail in this disclosure.

Furthermore, any of the software-based embodiments (comprising, for example, computer-executable instructions for causing a computing device to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed towards all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. Rather, the scope of the invention is defined by the following claims. We therefore claim as our invention all that comes within the scope of these claims.

We claim:

1. A method implemented at least in part by a computer system of refining source-code query results, the method comprising:

generating source-code query results for a query, the source-code query results being associated with code elements;

by the computer system, associating concepts with the source-code query results, wherein the concepts are connected to semantic properties of the code elements;

by the computer system, grouping the source-code query results into one or more semantic clusters based on a similarity of the concepts associated with the source-code query results and connected to the semantic properties of the code elements;

sending, to a client device, the source-code query results for the query and at least one semantic cluster option of one or more semantic cluster options, the at least one semantic cluster option corresponding to a semantic cluster of the one or more semantic clusters of the source-code query results, wherein the at least one semantic cluster option of the one or more semantic cluster options comprises a cluster identifier and an indication of a percentage of the source-code query results that are included in the semantic cluster of the one or more semantic clusters of the source-code query results;

causing a concept wheel to be displayed in a user interface of the client device, the concept wheel comprising the at least one semantic cluster option of the one or more semantic cluster options as a portion of an area of the concept wheel corresponding to the percentage of the source code query results that are included in the semantic cluster of the one or more semantic clusters of the source-code query results;

causing designated cluster option information to be displayed in the user interface of the client device, wherein the designated cluster option information overlays the concept wheel;

receiving an indication of a selection of the at least one semantic cluster option out of the one or more semantic cluster options; and based at least on the indication of the selection of the at least one semantic cluster option out of the one or more semantic cluster options, sending refined source-code query results, wherein the refined source-code query results comprise a subset of the source-code query results included in the semantic cluster of the one or more semantic clusters of the source-code query results corresponding to the at least one, selected semantic cluster option of the one or more semantic cluster options, thereby refining the source-code query results.

2. The method of claim 1, wherein generating the one or more semantic clusters comprises clustering based on words contained in code elements of source code.

3. The method of claim 2, wherein the query is received from a user searching for source code;

wherein the source-code query results are sent to the client device for display in the user interface; and wherein the source-code query results correspond to the code elements of the source code.

4. The method of claim 1 further comprising:
indexing source code, the indexing comprising creating index documents for code elements of the source code.

5. The method of claim 4, wherein creating the index documents comprises inputting values into fields at least by parsing the source code based on a programming language.

6. The method of claim 1 further comprising:
ranking the source-code query results; and
wherein generating the one or more semantic clusters comprises using one or more of the source-code query results chosen based on the rankings of the source-code query results.

7. The method of claim 1 further comprising:
based on the source-code query results, determining one or more facet values; and wherein generating refined source-code query results is further based at least on an indication of a selected at least one of the one of more facet values.

8. A computing system comprising:
one or more processors; and
memory, the memory storing computer-executable instructions causing the computing system to perform a method, the method comprising:
sending a source-code query to a server;
receiving a query response at a client comprising source-code query results and at least one semantic cluster option of one or more semantic cluster options, the at least one semantic cluster option corresponding to a semantic cluster of one or more semantic clusters of the source-code query results, wherein the at least one semantic cluster option of the one or more semantic cluster options comprises a cluster identifier and an indication of a percentage of the source-code query results that are included in the semantic cluster of the one or more semantic clusters of the source-code query results, wherein the one or more semantic clusters indicate similar concepts which are connected to semantic properties of the one or more source-code query results, and wherein the cluster identifier is based on words in index documents associated with the semantic cluster of the one or more semantic clusters;
displaying, at the client, a concept wheel comprising the at least one semantic cluster option of the one or more semantic cluster options as a portion of an area of the concept wheel corresponding to the percentage of the source-code query results that are included in the semantic cluster of the one or more semantic clusters of the source-code query results;
displaying, at the client, designated cluster option information, wherein the designated cluster option information overlays the concept wheel;
receiving a selected unwanted semantic cluster option;
responsive to receiving the selected unwanted semantic cluster option, removing the selected unwanted semantic cluster option and creating a new concept wheel;
selecting the at least one semantic cluster option of the one or more semantic cluster options;
sending, to the server, an indication of the selected at least one semantic cluster option of the one or more semantic cluster options; and
receiving, at the client, refined source-code query results based at least on the indication of the selected at least one semantic cluster option of the one or more semantic cluster options, the refined source-code query results comprising a subset of the source-code query results included in the semantic cluster of the one or more semantic clusters of the source-code query results corresponding to the at least one semantic cluster option of the one or more semantic cluster options.

9. A computing system comprising:
one or more processors; and
memory, the memory storing computer-executable instructions causing the computing system to perform a method, the method comprising:
receiving one or more source-code query results, one or more facet values that are associated with groups of the one or more source-code query results categorized under one or more facets, and at least one semantic cluster option corresponding to a semantic cluster of the one or more source-code query results, the at least one semantic cluster option comprises a semantic cluster identifier and an indication of a percentage of the one or more source-code query results that are included in the semantic cluster of the one or more source-code query results, wherein the at least one semantic cluster option is depicted in a concept wheel, wherein the semantic cluster is based on similar concepts which are connected to semantic properties of the one or more query results that are included in the semantic cluster, and wherein the semantic cluster identifier indicates a concept based on similar entries in index documents associated with the semantic cluster;
displaying designated cluster option information, wherein the designated cluster option information overlays the concept wheel;
receiving a selected unwanted semantic cluster option;
responsive to receiving the selected unwanted semantic cluster option, removing the selected unwanted semantic cluster option and creating a new concept wheel;
sending one or more selections of the one or more facet values that are associated with the groups of the one or more source-code query results; and
based at least on the one or more selections of the one or more facet values, receiving a subset of the one or more source-code query results.

10. The system of claim 9 further comprising:
receiving one or more facet options comprising one or more facets, wherein a facet of the one or more facets comprises a category based on a code attribute associated with at least one of the one or more source-code query results.

11. The system of claim 10, wherein the code attribute associated with the one or more source-code query results is based on syntax of source-code elements associated with the one or more source-code query results.

12. The system of claim 10, wherein a facet option of the one or more facet options comprises at least one of the one or more facet values, wherein the at least one of the one or more facet values corresponds to a sub-set of the one or more source-code query results.

13. The system of claim 9, wherein a facet value of the one or more facet values comprises a code element identifier of a code element and an indicator of a number of the one or more source-code query results associated with the code element.

14. The system of claim 9 further comprising:
indexing source code at least by creating index documents based on code elements of the source code;
wherein creating the index documents comprises inputting values into fields at least by parsing the source code based on a syntax of a programming language.

15. The system of claim 14, wherein a code element identifier comprises an indication of a source-code element corresponding to values of fields in index documents of the one or more source-code query results.

16. The system of claim 9 further comprising:
selecting the at least one semantic cluster option; and
wherein the subset of the one or more source-code query results is further based at least on the selected at least one semantic cluster option.

17. A method implemented at least in part by a computing system, the method comprising:
receiving a source-code query from a client at a server;
determining, at the server, source-code query results based on the source-code query;
based on the source-code query results, determining one or more facets, the one or more facets based on a code attribute of source-code elements associated with the source-code query results;
based on the source-code query results, determining one or more facet values, the one or more facet values associated with a set of the source-code query results associated with at least one facet of the one or more facets;
determining one or more semantic clusters of the source-code query results;
sending, to the client, a query response comprising source-code query results, at least one semantic cluster option, and one or more facet options comprising the one or more facets and the one or more facet values, the facet values comprising a code element identifier and an indicator of a number of the source-code query results in the set of the source-code query results associated with the code element identifier, wherein the at least one semantic cluster option corresponds to a semantic cluster of the one or more semantic clusters of the source-code query results and the at least one semantic cluster option comprises a semantic cluster identifier and an indication of a percentage of the source-code query results that are included in the semantic cluster of the one or more semantic clusters of the source-code query results, wherein the semantic cluster of the one or more semantic clusters of the source-code query results comprises a subset of the source-code query results, wherein the at least one semantic cluster option is depicted in a concept wheel, further wherein designated cluster option information is depicted, wherein the designated cluster option information overlays the concept wheel;
receiving a selected unwanted semantic cluster option;
responsive to receiving the selected unwanted semantic cluster option, removing the selected unwanted semantic cluster option and creating a new concept wheel, wedge, quadrilateral, oval, polygon, or asymmetrical shape;
receiving, at the server, an indication of a selected at least one of the one or more facet values; and
sending, to the client, refined source-code query results based on the indication of the selected at least one of the one or more facet values, the refined source-code query results comprising the set of the source-code query results.

18. A non-transitory computer-readable medium storing computer-executable instructions causing a computing system to perform a method, the method comprising:
in response to a query of an index, generating source-code query results associated with a plurality of index documents of the index;
determining one or more facet values based at least on the index documents associated with the source-code query results categorized under one or more facets, wherein the one or more facet values are used to refine the source-code query results;
determining one or more semantic clusters that are based at least on a semantic relationship of source-code in one or more of the plurality of index documents associated with the source-code query results;
sending the source-code query results, the one or more facet values, and at least one semantic cluster option to a client comprising a user interface to display the source-code query results, the one or more facet values, and the at least one semantic cluster option on the user interface and to receive a selection of the one or more facet values and/or the at least one semantic cluster option via the user interface, wherein the at least one semantic cluster option corresponds to at least one semantic cluster of the one or more semantic clusters, wherein the at least one semantic cluster option comprises a cluster identifier and an indication of a percentage of the source-code query results that are included in the at least one semantic cluster of the one or more semantic clusters, wherein the at least one semantic cluster of the one or more semantic clusters comprises a subset of the source-code query results;
receiving a selected semantic cluster option of the at least one semantic cluster option and a selected facet value of the one or more facet values from the client;
determining refined source-code query results at least by determining an intersection of the selected semantic cluster option and the selected facet value, wherein the refined source-code query results comprise one or more of the source-code query results that are associated with the selected facet value and that are also associated with the selected semantic cluster option; and
sending the refined source-code query results to the client to display on the user interface.

* * * * *